US012156119B2

(12) United States Patent
Hosseini et al.

(10) Patent No.: US 12,156,119 B2
(45) Date of Patent: Nov. 26, 2024

(54) SIDELINK FEEDBACK PREEMPTION AND UPLINK MULTIPLEXING IN WIRELESS COMMUNICATIONS

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 17/478,631

(22) Filed: Sep. 17, 2021

(65) Prior Publication Data

US 2022/0095200 A1  Mar. 24, 2022

Related U.S. Application Data

(60) Provisional application No. 63/080,640, filed on Sep. 18, 2020.

(51) Int. Cl.
*H04W 48/02* (2009.01)
*H04B 17/318* (2015.01)
*H04W 92/18* (2009.01)

(52) U.S. Cl.
CPC .......... *H04W 48/02* (2013.01); *H04B 17/318* (2015.01); *H04W 92/18* (2013.01)

(58) Field of Classification Search
CPC ... H04W 48/02; H04W 92/18; H04W 72/569; H04W 72/20; H04W 72/563;
(Continued)

(56) References Cited

U.S. PATENT DOCUMENTS

2019/0394786 A1\* 12/2019 Parron .................... H04W 4/46
2021/0127383 A1\* 4/2021 Hui ........................ H04L 1/1864
(Continued)

OTHER PUBLICATIONS

Asia Pacific Telecom: "Discussion on SL Mode-2 Resource Allocation", 3GPP Draft, R1-1912250, 3GPP TSG-RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823321, 5 Pages, Retrieved from the Internet: URL:https://ftp.3gpp.org/tsg_ran/WG1_RL1/TSGR1_99/Docs/R1-1912250.zip, R1-1912250 Discussion on SL Mode-2 Resource Allocation.docx [retrieved on Nov. 9, 2019] the Whole Document.
(Continued)

*Primary Examiner* — Edan Orgad
*Assistant Examiner* — Malick A Sohrab
(74) *Attorney, Agent, or Firm* — Holland & Hart LLP

(57) ABSTRACT

Methods, systems, and devices for wireless communications are described in which multiple devices may implement sidelink communications for direct device-to-device exchange of information. Such devices (e.g., user equipment (UE) devices) may be configured with resources for sidelink communications, and may monitor for a sidelink preemption indication (SPI) from a base station and determine whether one or more sidelink communications is preempted based on the SPI. The sidelink communications may include a feedback communication that is transmitted using sidelink feedback resources. Based on an indication in a received SPI, it may be determined whether or not to transmit sidelink feedback. The sidelink feedback may be transmitted to one or more other sidelink devices, or to a base station, and preemption of the sidelink feedback may be determined based on one or more parameters associated with the side-
(Continued)

link communications, associated with the SPI, or any combinations thereof.

20 Claims, 19 Drawing Sheets

(58) Field of Classification Search
CPC ..... H04W 72/25; H04B 17/318; H04B 17/24; H04B 17/328; H04L 1/1812; H04L 5/0055
See application file for complete search history.

(56) References Cited

U.S. PATENT DOCUMENTS

| | | | |
|---|---|---|---|
| 2022/0053496 A1* | 2/2022 | Yu | H04W 72/20 |
| 2022/0078758 A1* | 3/2022 | Lee | H04W 52/0219 |
| 2022/0110076 A1* | 4/2022 | Shimoda | H04W 56/0015 |
| 2022/0232583 A1* | 7/2022 | Jiang | H04W 72/1263 |
| 2023/0292346 A1* | 9/2023 | Hui | H04L 5/0058 |

OTHER PUBLICATIONS

International Search Report and Written Opinion—PCT/US2021/051028—ISA/EPO—Dec. 22, 2021.
Lenovo, et al., "Discussion on Resource Allocation for NR Sidelink Mode 2", 3GPP Draft, 3GPP TSG RAN WG1 #99, R1-1912324, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819998, 5 Pages, Retrieved from the Internet: URL: https://ftp.3gpp.org/tsg_ran/WG1_RL1/TSGR1_99/Docs/R1-1912324.zip. R1-1912324.docx [retrieved on Nov. 8, 2019] the whole document.
Lenovo, et al., "Discussion on Resource Allocation for NR Sidelink Mode 1", 3GPP Draft, 3GPP TSG RAN WG1 #98bis, R1-1910145, Chongqing, China, Oct. 14-20, 2019, Oct. 20, 2019 (Oct. 20, 2019), 8 Pages, XP051808446, Retrieved from the Internet: URL: https://ftp.3gpp.org/tsg_ran/WG1_RL1/TSGR1_98b/Docs/R1-1910145.zip. R1-1910145.docx [Retrieved on Oct. 5, 2019] the Whole Document.

* cited by examiner

220 — Configuration Information

225 — Sidelink Communications (e.g., PSSCH)

230 — Sidelink Feedback (e.g., PSFCH - Potential Interference w/ Uu Link)

235 — Sidelink Preemption Indication

240 — Access Link Communication (e.g., PUSCH)

245 — Access Link Feedback Resources (e.g., PUCCH, for reporting sidelink feedback to base station)

200

SIDELINK FEEDBACK PREEMPTION AND UPLINK MULTIPLEXING IN WIRELESS COMMUNICATIONS

CROSS REFERENCE

The present application for patent claims the benefit of U.S. Provisional Patent Application No. 63/080,640 by HOSSEINI et al., entitled "SIDELINK FEEDBACK PREEMPTION AND UPLINK MULTIPLEXING IN WIRELESS COMMUNICATIONS," filed Sep. 18, 2020, assigned to the assignee hereof, and expressly incorporated by reference herein.

FIELD OF TECHNOLOGY

The following relates to wireless communications, including sidelink feedback preemption and uplink multiplexing in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, UEs may communicate with one or more base stations using an access link (e.g., via a Uu interface in a 4G or 5G system). Further, some UEs may communicate directly with one or more other UEs using a sidelink (e.g., a PC5 interface), such that the UEs communicate directly rather than through a base station for some communications. In some cases, a base station may configure resources for sidelink communications, and UEs may use the configured sidelink resources for direct communications via sidelinks. Efficient allocation and use of sidelink resources in such deployments may help to enhance the efficiency, reliability, and latency of a network, and thus may be desirable.

SUMMARY

The described techniques relate to improved methods, systems, devices, and apparatuses that support sidelink feedback preemption and uplink multiplexing in wireless communications. In accordance with various aspects, the described techniques provide for identifying a set of sidelink feedback resources for providing feedback indications (e.g., hybrid automatic repeat request (HARQ) acknowledgment/negative-acknowledgment (ACK/NACK) feedback) associated with sidelink communications. A sidelink user equipment (UE) may receive a sidelink preemption indication (SPI) from a base station that indicates one or more sidelink communications are preempted.

In some cases, based on the SPI, the UE may determine whether or not to transmit sidelink feedback. In some cases, the UE may cancel one or more sidelink data transmissions (e.g., physical sidelink shared channel (PSSCH) transmissions) that use resources indicated by the SPI, but may transmit the sidelink feedback (e.g., using physical sidelink feedback channel (PSFCH) resources). In other cases, the UE may preempt the transmission of the sidelink feedback. In some cases, whether to transmit or preempt the sidelink feedback may be based at least in part on one or more of a priority of the sidelink communication associated with the sidelink feedback, a priority indicated in the SPI, whether the sidelink communication is a unicast or multicast communication, a reference signal received power (RSRP) measurement, a zone identification of the SPI, a resource pool ID indicated by the SPI, or any combinations thereof.

In some cases, a UE that transmits a sidelink communication (e.g., a PSSCH transmission) may receive feedback from a receiving UE, and the transmitting UE may report the feedback to a serving base station in a feedback report (e.g., for use in allocation of additional sidelink resources such as for one or more retransmissions). In some cases, the indication of the sidelink feedback in the feedback report may be omitted when the SPI is associated with the sidelink communication, sidelink feedback, or both. In other cases, the transmitting sidelink UE may report a NACK for the sidelink feedback in the feedback report when the SPI is associated with the sidelink communication, sidelink feedback, or both; or based on an absence of sidelink feedback from the receiving UE. Such a NACK indication may provide a feedback report in an uplink control information (UCI) transmission that has a uniform size that is expected at the base station.

A method of wireless communication at a first UE is described. The method may include receiving a sidelink communication from a second UE via a sidelink channel between the first UE and the second UE, identifying a set of sidelink feedback resources for a feedback transmission to the second UE, the feedback transmission providing feedback associated with the sidelink communication from the second UE, receiving a sidelink preemption indication that indicates one or more sidelink communications between the first UE and the second UE are preempted, and determining whether to transmit the feedback transmission to the second UE via the set of sidelink feedback resources based on the sidelink preemption indication.

An apparatus for wireless communication at a first UE is described. The apparatus may include a processor, memory coupled with the processor, and instructions stored in the memory. The instructions may be executable by the processor to cause the apparatus to receive a sidelink communication from a second UE via a sidelink channel between the first UE and the second UE, identify a set of sidelink feedback resources for a feedback transmission to the second UE, the feedback transmission providing feedback associated with the sidelink communication from the second UE, receive a sidelink preemption indication that indicates one or more sidelink communications between the first UE and the second UE are preempted, and determine whether to transmit the feedback transmission to the second UE via the set of sidelink feedback resources based on the sidelink preemption indication.

Another apparatus for wireless communication at a first UE is described. The apparatus may include means for receiving a sidelink communication from a second UE via a sidelink channel between the first UE and the second UE, identifying a set of sidelink feedback resources for a feedback transmission to the second UE, the feedback transmission providing feedback associated with the sidelink communication from the second UE, receiving a sidelink preemption indication that indicates one or more sidelink communications between the first UE and the second UE are preempted, and determining whether to transmit the feedback transmission to the second UE via the set of sidelink feedback resources based on the sidelink preemption indication.

A non-transitory computer-readable medium storing code for wireless communication at a first UE is described. The code may include instructions executable by a processor to receive a sidelink communication from a second UE via a sidelink channel between the first UE and the second UE, identify a set of sidelink feedback resources for a feedback transmission to the second UE, the feedback transmission providing feedback associated with the sidelink communication from the second UE, receive a sidelink preemption indication that indicates one or more sidelink communications between the first UE and the second UE are preempted, and determine whether to transmit the feedback transmission to the second UE via the set of sidelink feedback resources based on the sidelink preemption indication.

In some examples of the method, apparatuses, and non-transitory computer-readable medium described herein, the determining may include operations, features, means, or instructions for determining that the feedback transmission is to be transmitted when the sidelink preemption indication is associated with the set of sidelink feedback resources, and transmitting the feedback transmission via the set of sidelink feedback resources. Some examples of the method, apparatuses, and non-transitory computer-readable medium described herein may further include operations, features, means, or instructions for determining that the feedback transmission is to be preempted when the sidelink preemption indication is associated with the set of sidelink feedback resources, and preempting the feedback transmission via the set of sidelink feedback resources. Some examples of the method, apparatuses, and non-transitory computer-readable medium described herein may further include operations, features, means, or instructions for receiving configuration information that indicates whether feedback transmissions using sidelink feedback resources are to be preempted when the sidelink preemption indication is associated with the set of sidelink feedback resources, and transmitting or preempting the feedback transmission based on the configuration information.

In some examples of the method, apparatuses, and non-transitory computer-readable medium described herein, the configuration information may be associated with the first UE, may be associated with a resource pool of a set of resource pools, may be associated with a carrier of a set of carriers, or any combinations thereof. In some examples of the method, apparatuses, and non-transitory computer-readable medium described herein, the configuration information may be received with a sidelink configuration for the sidelink communications, may be received in radio resource control signaling from a serving base station, or any combinations thereof.

In some examples of the method, apparatuses, and non-transitory computer-readable medium described herein, the determining may be based on one or more parameters associated with the sidelink communication and one or more corresponding parameters associated with the sidelink preemption indication. In some examples of the method, apparatuses, and non-transitory computer-readable medium described herein, the one or more parameters include a priority of the sidelink communication, a priority indicated by the sidelink preemption indication, a unicast or multicast transmission type associated with the sidelink communication, a reference signal received power (RSRP) measurement, a zone identification indicated by the sidelink preemption indication, a resource pool identification provided by the sidelink preemption indication, or any combinations thereof. In some examples of the method, apparatuses, and non-transitory computer-readable medium described herein, the RSRP measurement may be associated with a reference signal from a serving base station, and where the sidelink feedback transmission may be transmitted based on the RSRP being at or below a received power threshold provided with the one or more parameters. In some examples of the method, apparatuses, and non-transitory computer-readable medium described herein two or more separate RSRP threshold values may be provided for two or more priorities of the sidelink preemption indication, for two or more priorities of the sidelink communication, or any combinations thereof.

In some examples of the method, apparatuses, and non-transitory computer-readable medium described herein, the sidelink preemption indication provides one or more of a time/frequency indication of the sidelink resources that are to be preempted, a priority associated with the sidelink preemption indication, a zone identification, one or more reference signal received power thresholds for preemption determination, a periodicity of preempted resources, a sidelink resource pool identification, or any combinations thereof.

A method of wireless communication at a first UE is described. The method may include transmitting a sidelink communication to a second UE via a sidelink channel between the first UE and the second UE, identifying a set of sidelink feedback resources for sidelink feedback from the second UE associated with reception of the sidelink communication at the second UE, receiving a sidelink preemption indication that indicates one or more sidelink communications between the first UE and the second UE are preempted, and determining whether to transmit the sidelink feedback from the second UE to a serving base station based on the sidelink preemption indication.

An apparatus for wireless communication at a first UE is described. The apparatus may include a processor, memory coupled with the processor, and instructions stored in the memory. The instructions may be executable by the processor to cause the apparatus to transmit a sidelink communication to a second UE via a sidelink channel between the first UE and the second UE, identify a set of sidelink feedback resources for sidelink feedback from the second UE associated with reception of the sidelink communication at the second UE, receive a sidelink preemption indication that indicates one or more sidelink communications between the first UE and the second UE are preempted, and determine whether to transmit the sidelink feedback from the second UE to a serving base station based on the sidelink preemption indication.

Another apparatus for wireless communication at a first UE is described. The apparatus may include means for transmitting a sidelink communication to a second UE via a sidelink channel between the first UE and the second UE, identifying a set of sidelink feedback resources for sidelink feedback from the second UE associated with reception of the sidelink communication at the second UE, receiving a sidelink preemption indication that indicates one or more sidelink communications between the first UE and the second UE are preempted, and determining whether to transmit the sidelink feedback from the second UE to a serving base station based on the sidelink preemption indication.

A non-transitory computer-readable medium storing code for wireless communication at a first UE is described. The code may include instructions executable by a processor to transmit a sidelink communication to a second UE via a sidelink channel between the first UE and the second UE, identify a set of sidelink feedback resources for sidelink feedback from the second UE associated with reception of the sidelink communication at the second UE, receive a sidelink preemption indication that indicates one or more sidelink communications between the first UE and the second UE are preempted, and determine whether to transmit the sidelink feedback from the second UE to a serving base station based on the sidelink preemption indication.

In some examples of the method, apparatuses, and non-transitory computer-readable medium described herein, the determining may include operations, features, means, or instructions for determining to preempt transmission of the sidelink feedback to the serving base station based on the sidelink preemption indication indicating preemption of sidelink resources associated with the sidelink communication or the set of sidelink feedback resources. Some examples of the method, apparatuses, and non-transitory computer-readable medium described herein may further include operations, features, means, or instructions for setting the sidelink feedback from the second UE to indicate a negative acknowledgment based on the sidelink preemption indication indicating preemption of the sidelink resources associated with the sidelink communication, and transmitting the sidelink feedback to the serving base station. Some examples of the method, apparatuses, and non-transitory computer-readable medium described herein may further include operations, features, means, or instructions for setting the sidelink feedback from the second UE to indicate the negative acknowledgment based on the sidelink preemption indication indicating preemption of the set of sidelink feedback resources or based on an absence of sidelink feedback in the set of sidelink feedback resources. In some examples of the method, apparatuses, and non-transitory computer-readable medium described herein, the negative acknowledgment indication of the sidelink feedback provides a uniform payload size for an uplink control information transmission to the serving base station that includes the sidelink feedback. In some examples of the method, apparatuses, and non-transitory computer-readable medium described herein, the sidelink preemption indication provides one or more of a time/frequency indication of the sidelink resources that are to be preempted, a priority associated with the sidelink preemption indication, a zone identification, one or more reference signal received power thresholds for preemption determination, a periodicity of preempted resources, a sidelink resource pool identification, or any combinations thereof.

A method of wireless communications at a base station is described. The method may include transmitting configuration information to one or more UEs that indicates whether feedback transmissions using sidelink feedback resources are to be preempted when a sidelink preemption indication is associated with a set of sidelink feedback resources, transmitting a sidelink preemption indication that indicates one or more sidelink communications between the one or more UEs are preempted, and monitoring for sidelink feedback from the one or more UEs based on the sidelink preemption indication.

An apparatus for wireless communications at a base station is described. The apparatus may include a processor, memory coupled with the processor, and instructions stored in the memory. The instructions may be executable by the processor to cause the apparatus to transmit configuration information to one or more UEs that indicates whether feedback transmissions using sidelink feedback resources are to be preempted when a sidelink preemption indication is associated with a set of sidelink feedback resources, transmit a sidelink preemption indication that indicates one or more sidelink communications between the one or more UEs are preempted, and monitor for sidelink feedback from the one or more UEs based on the sidelink preemption indication.

Another apparatus for wireless communications at a base station is described. The apparatus may include means for transmitting configuration information to one or more UEs that indicates whether feedback transmissions using sidelink feedback resources are to be preempted when a sidelink preemption indication is associated with a set of sidelink feedback resources, transmitting a sidelink preemption indication that indicates one or more sidelink communications between the one or more UEs are preempted, and monitoring for sidelink feedback from the one or more UEs based on the sidelink preemption indication.

A non-transitory computer-readable medium storing code for wireless communications at a base station is described. The code may include instructions executable by a processor to transmit configuration information to one or more UEs that indicates whether feedback transmissions using sidelink feedback resources are to be preempted when a sidelink preemption indication is associated with a set of sidelink feedback resources, transmit a sidelink preemption indication that indicates one or more sidelink communications between the one or more UEs are preempted, and monitor for sidelink feedback from the one or more UEs based on the sidelink preemption indication.

In some examples of the method, apparatuses, and non-transitory computer-readable medium described herein, the sidelink feedback indicates a negative acknowledgment based on the sidelink preemption indication. In some examples of the method, apparatuses, and non-transitory computer-readable medium described herein, the sidelink feedback from the one or more UEs indicates negative acknowledgment based on the sidelink preemption indication indicating preemption of the set of sidelink feedback resources or based on an absence of sidelink feedback in the set of sidelink feedback resources.

In some examples of the method, apparatuses, and non-transitory computer-readable medium described herein, the negative acknowledgment indication of the sidelink feedback provides a uniform payload size for an uplink control information transmission to the base station that includes the sidelink feedback. In some examples of the method, apparatuses, and non-transitory computer-readable medium described herein, the sidelink preemption indication provides one or more of a time/frequency indication of the sidelink resources that are to be preempted, a priority associated with the sidelink preemption indication, a zone identification, one or more reference signal received power thresholds for preemption determination, a periodicity of preempted resources, a sidelink resource pool identification, or any combinations thereof.

DETAILED DESCRIPTION

Figure 1:
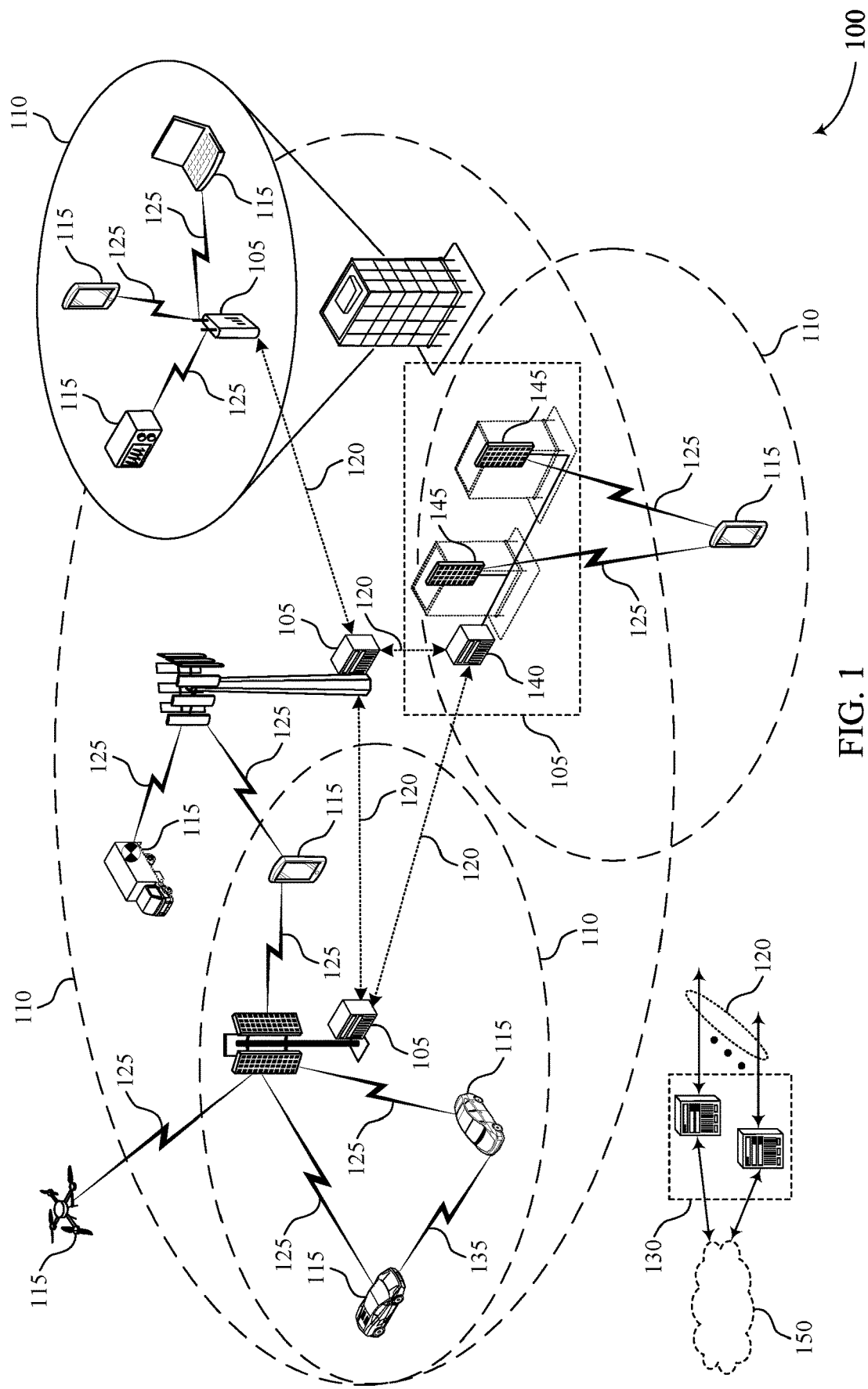
FIG. 1 illustrates an example of a system for wireless communications that supports sidelink feedback preemption and uplink multiplexing in wireless communications in accordance with aspects of the present disclosure.

Some wireless communications systems may support both access links and sidelinks. An access link is a communication link between a user equipment (UE) and a base station. In some examples, an access link may be referred to as a Uu interface. Specifically, the Uu interface may refer to an over-the-air interface for downlink transmissions, uplink transmissions, or both. A sidelink is a communication link between similar devices and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples) between multiple base stations (e.g., in an integrated access and backhaul (IAB) deployment), or between other types of wireless communications devices. It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one wireless device to one or more other similar wireless devices.

In some cases, a base station may configure a set of resources for use in sidelink communications between UEs. For example, the base station may configure periodic resources that may be used for physical sidelink shared channel (PSSCH), physical sidelink control channel (PSCCH), and physical sidelink feedback channel (PSFCH) communications between UEs. The PSFCH resources may be used by a receiving UE to indicate acknowledgement (ACK) or negative-acknowledgment (NACK) feedback for a PSSCH communication from a transmitting UE, for example. In some cases, the base station may determine to preempt one or more sidelink communications for a portion of the sidelink resources. For example, a high priority communication from another UE using an access link may be scheduled by the base station that preempts the one or more sidelink communications. An indication of such a preemption may be provided by the base station to sidelink UEs in a sidelink preemption indication (SPI).

In accordance with various aspects discussed herein, techniques are provided for preempting sidelink feedback and uplink multiplexing in the event of an SPI that indicates one or more sidelink resources. In some cases, a sidelink UE may identify a set of sidelink feedback resources for providing feedback indications (e.g., hybrid automatic repeat request (HARD) ACK/NACK feedback) associated with sidelink communications and, based on the SPI, may determine whether or not to transmit sidelink feedback. In some cases, the UE may cancel one or more sidelink data transmissions (e.g., PSSCH transmissions) that use resources indicated by the SPI, but may transmit the sidelink feedback (e.g., PSFCH transmissions). In other cases, the UE may preempt the transmission of the sidelink feedback. In some cases, the determination of whether to transmit or preempt the sidelink feedback may be based at least in part on one or more of a priority of the sidelink communication associated with the sidelink feedback, a priority indicated in the SPI, whether the sidelink communication is a unicast or multicast communication, a reference signal received power (RSRP) measurement, a zone identification of the SPI, a resource pool ID indicated by the SPI, or any combinations thereof.

In some cases, a UE that transmits a sidelink communication (e.g., a PSSCH transmission) may receive feedback from a receiving sidelink UE, and may report the feedback to a serving base station (e.g., for use in allocation of sidelink resources) in a feedback report that is provided to the serving base station, such as with uplink control information (UCI). In some cases, the indication of the sidelink feedback in the feedback report may be omitted if the SPI is associated with the sidelink communication, sidelink feedback, or both. In other cases, the transmitting sidelink UE may report a NACK for the sidelink feedback in the feedback report in the SPI is associated with the sidelink communication, sidelink feedback, or both; or based on an absence of sidelink feedback from the receiving UE. Such a NACK indication may provide a feedback report in an uplink control information (UCI) transmission that has a uniform size that is expected at the base station.

Various aspects of the subject matter described herein may be implemented to realize one or more of the following potential advantages. The techniques employed by the described base stations and UEs may provide benefits and enhancements to the operation of a wireless communications system. For example, operations performed by the UEs may provide improvements to reliability and efficiency in communications with sidelink UEs and with other UEs that may transmit or receive high priority or low latency communications. Such improvements may enhance efficiency of wireless communications at a UE by allowing for flexible allocation of sidelink resources with configurable preemption in the event of other communications that may collide with the sidelink resources. The described techniques may thus include features for improvements to reliability in communications, enhanced communications efficiency for sidelink and access link UEs, among other benefits.

Aspects of the disclosure are initially described in the context of wireless communications systems. Aspects of the disclosure are further illustrated by and described with reference to process flows, apparatus diagrams, system diagrams, and flowcharts that relate to sidelink feedback preemption and uplink multiplexing in wireless communications.

FIG. 1 illustrates an example of a wireless communications system 100 that supports sidelink feedback preemption and uplink multiplexing in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, multiple UEs 115 may implement sidelink communications for direct UE-to-UE exchange of information. Such UEs 115, in accordance with various described techniques, may monitor for a SPI from a base station 105 and determine whether one or more sidelink communications is preempted based on the SPI. In some cases, UEs 115 may be configured (e.g., by a base station 105) with a set of periodic resources for transmission of the sidelink communications, which may include sidelink communications via PSSCH, PSCCH, PSFCH, or any combinations thereof. In some cases, a first UE 115 may receive a sidelink communication from a second UE 115 (e.g., a PSSCH communication), and determine HARQ ACK/NACK feedback for the sidelink communication. The first UE 115 may identify sidelink feedback resources for providing feedback indications (e.g., HARQ ACK/NACK feedback) associated with sidelink communications and, based on an indication in a received SPI, may determine whether or not to transmit sidelink feedback, in accordance with various techniques as discussed herein. In some cases, the sidelink feedback may be PSFCH feedback to the second UE. In other cases, the first UE 115 may transmit a PSSCH communication to the second UE 115, and the sidelink feedback may be reported to a serving base station 105 (e.g., for use in allocation of sidelink resources) in a feedback report that is provided with UCI to the serving base station 105. In some cases, the indication of the sidelink feedback in the feedback report may be transmitted or preempted in accordance with various techniques as discussed herein.

Figure 2:
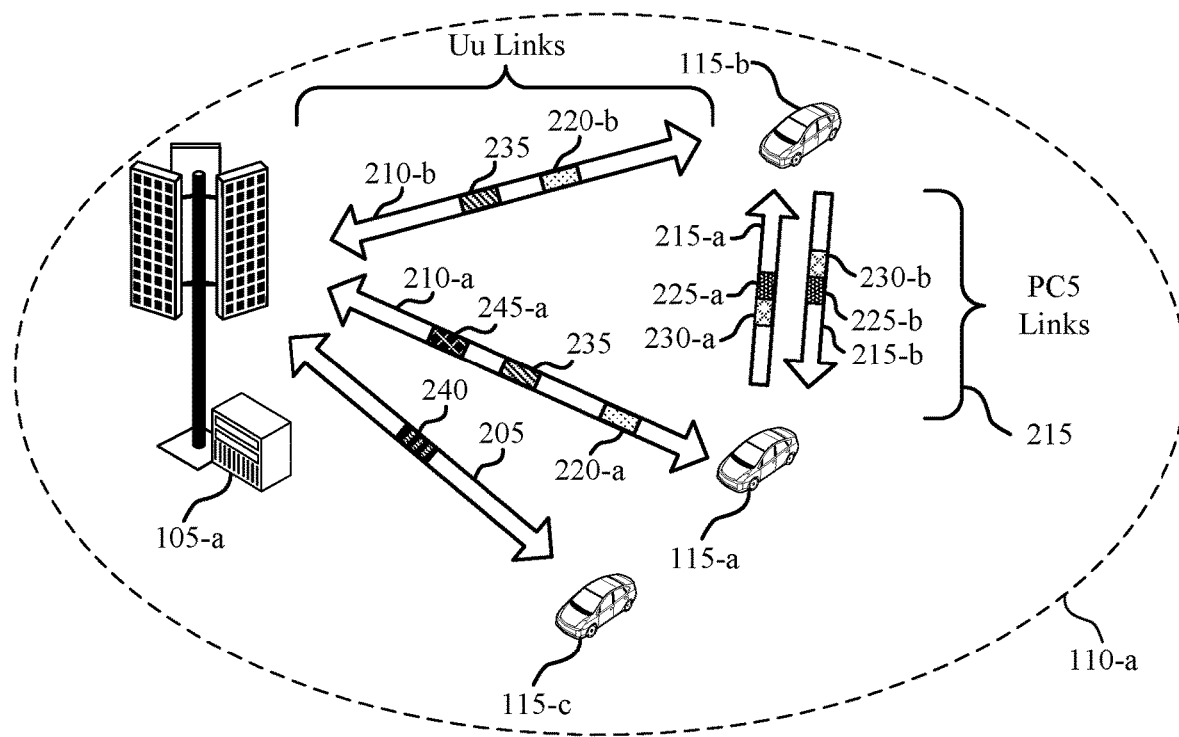
FIG. 2 illustrates an example of a portion of a wireless communications system that supports sidelink feedback preemption and uplink multiplexing in wireless communications in accordance with aspects of the present disclosure.

FIG. 2 illustrates an example of a wireless communications system 200 that supports sidelink feedback preemption and uplink multiplexing in wireless communications in accordance with aspects of the present disclosure. In some examples, wireless communications system 200 may implement aspects of wireless communications system 100. Wireless communications system 200 may include a base station 105-a, a first UE 115-a, a second UE 115-b, and a third UE 115-c which may be examples of a base station 105 and UEs 115, respectively, described with reference to FIG. 1. In some cases, the first UE 115-a and the second UE 115-b may communicate with each other (e.g., within a V2X system, a D2D system, and the like) via sidelink communications.

In this example, each of the UEs 115 may be in a coverage area 110-a (e.g., a coverage area 110 with reference to FIG. 1) of the base station 105. In other examples, one or more UEs 115 may be outside of the coverage area 110-a. The first UE 115-a, the second UE 115-b, or both, may communicate with the base station 105-a via a respective access link 210, and the third UE 115-c may communicate with base station 105-a via access link 205. The access links 205, 210, may be examples of Uu links that may be used to provide downlink and uplink communications (e.g., via the Uu interface) between UEs 115 and the base station 105-a. In the example of FIG. 2, a first access link 210-a may be established with the first UE 115-a and a second access link 210-b may be established with the second UE 115-b. Further, UEs 115 may establish a sidelink 215 (e.g., a PC5 link) that may be used for direct communications between the first UE 115-a and the second UE 115-b. It is noted that the example of FIG. 2 is provided for purposes of discussion and illustration only, and numerous other deployments are possible, such as cases where communications between the base station 105-*a* and one or more UEs 115 are relayed through another UE 115 (e.g., relayed using sidelink 215 when a UE 115 is outside of coverage area 110-*a*), cases where additional UEs 115 are present, cases where other types of UEs 115 or relays are present (e.g., roadside units in a V2X system), cases where UEs 115 are deployed in a factory automation or other industrial setting, or any combinations thereof, to name but a few examples. Techniques as discussed herein may be used in any such deployments.

In accordance with techniques discussed herein, the base station 105-*a* may provide configuration information 220 to the first UE 115-*a* and the second UE 115-*b* related to sidelink communications. Such configuration information may include, for example, an indication of wireless resources that are allocated for sidelink communications 225 between the first UE 115-*a* and the second UE 115-*b* (e.g., PSSCH resources) and resources that are allocated for sidelink feedback 230 (e.g., PSFCH resources for sidelink HARQ feedback). For example, the first UE 115-*a* may transmit first sidelink communications 225-*a* and first sidelink feedback 230-*a* (e.g., for a prior sidelink communication) to the second UE 115-*b* in a first sidelink carrier 215-*a*. The second UE 115-*b* may receive the first sidelink communications 225-*a* and determine second sidelink feedback 230-*b* that may be transmitted back to the first UE 115-*a* (e.g., along with second sidelink communications 225-*b*) in a second sidelink carrier 215-*b*. In some cases, the access links 210 and the sidelinks 215 may use a same carrier in a licensed band of radio frequency spectrum. In other cases, one or more of the access links 210 or sidelinks 215 may use unlicensed or shared radio frequency spectrum, may use different carriers, or combinations thereof.

In some cases, the configuration information 220 may configure the first UE 115-*a* and the second UE 115-*b* to operate with Mode 1 resource allocation in which the network allocates resources for each UE 115 (e.g., in dynamic scheduling using DCI format 3_0, or with a configured pool of resources), or with Mode 2 resource allocation in which the UEs 115 select sidelink resources from a sidelink resource pool using sensing and reservation techniques to identify resources without direct control of the base station 105-*a*. In some cases, sidelink resources may be allocated in resources that are otherwise available for uplink communications on access links 205 and 210 (e.g., in uplink symbols of the Uu interface). In other cases, sidelink resources may also be allocated in flexible resources, downlink resources, or both, of the access links 205 and 210 (e.g., in flexible or downlink symbols of the Uu interface). In some cases, on a given carrier, the base station 105-*a* may allocate some resources for sidelink via a resource pool configuration, and also support some Uu users on the carrier.

In some cases, a third UE 115-*c* may have an established access link 205, and the base station 105-*a* may determine that high priority access link communications 240 are to have resources allocated for the third UE 115-*c* (e.g., for URLLC or mission critical data). In some cases, the base station 105-*a* may allocate resources for the high priority access link communications 240 that collide with one or more sidelink resources that have been allocated for sidelink communications 225, sidelink feedback 230, or both. In order to avoid interference between traffic on the sidelinks 215 and the access link 205, the base station 105-*a* may transmit a SPI 235 to the first UE 115-*a* and the second UE 115-*b*. In some cases, the SPI 235 may be transmitted in downlink control information (DCI) on a PDCCH, and may alternatively or additionally be transmitted in a broadcast transmission from the base station 105-*a* (e.g., on a physical broadcast channel (PBCH)). The SPI 235 may be received at the first UE 115-*a*, second UE 115-*b*, or both, which may then preempt one or more sidelink transmissions in order to reduce interference with the high priority access link communications 240. Such preemption techniques may provide the base station 105-*a* with flexibility in scheduling sidelink resources as well as in allocating access link resources for some communications, such as high priority communications. By providing sufficient sidelink resources, the first UE 115-*a* and second UE 115-*b*, and any other sidelink UEs, may exchange data in an efficient manner with relatively high reliability and low latency relative to cases where the base station 105-*a* may be constrained in the amount of sidelink resources that may be granted. Further, reliability may be increased and latency may be decreased for the high priority access link communications 240, through the ability of the base station 105-*a* to schedule such communications using resources that may collide with the allocated sidelink resources.

In some cases, the base station 105-*a* may have capabilities to multiplex users with different service priorities (e.g., enhanced mobile broadband (eMBB) with a lower service priority and URLLC users with a higher service priority, which in some cases may be identified based on a network slice ID or network slice selection assistance information (NSSAI)). When multiplexing different services on access links 205 and 210, the base station 105-*a*, in some cases, may transmit an uplink cancellation indication (CI) for users with lower priority levels (e.g., a UE 115 with a resource allocation for a network slice ID that is configured with a lower priority level than one or more other network slice IDs) that may cancel the lower priority communication. In other cases, multiplexing different services on access links 205 and 210 may be provided through power boosting UEs 115 with higher priority levels, which may enhance the likelihood of successful reception of the communication even with a concurrent uplink transmission of another UE 115. Thus, both schemes allow for dynamic sharing of resources across users with different transmission priorities, and the base station 105-*a* may control how the resources should be shared. Further, in some cases, an uplink CI may not apply to uplink control information (UCI) that may include HARQ feedback transmitted by a UE 115 to the base station 105-*a*, because PUCCH resources for such UCI may be allocated at the edges of the carrier, and higher priority communications may be allocated resources away from the edges of the carrier which are non-overlapping. However, PSFCH resources may not be allocated in such a manner, and thus sidelink HARQ feedback may be transmitted in resources that may overlap with higher priority communications. This may occur due to the resources used for PSFCH being dependent on the subchannels used for the associated PSSCH transmission, the slot in which the PSSCH was sent, the source ID and the group ID of the user (for groupcast sidelink), or any combinations thereof.

Accordingly, a SPI 235 may be associated with PSFCH resources that may be used to transmit sidelink feedback 230 (e.g., sidelink HARQ ACK/NACK feedback). In some cases, the UE 115 that is to transmit the sidelink feedback 230, in the event that SPI 235 is received that indicates PSFCH resources, may determine whether or not to preempt the sidelink feedback 230. In some cases, the determination of whether or not to transmit the sidelink feedback 230 may be based on one or more parameters of the sidelink communications 230, one or more parameters indicated by the SPI 235, or any combinations thereof. In some cases, the SPI 235 may indicate one or more of a time/frequency indication of the sidelink resources to be preempted, a priority for preemption, a zone identification (e.g., that indicates one or more beams, synchronization signal block (SSB) IDs, one or more areas, or combinations thereof associated with the preemption), a reference signal received power (RSRP) threshold for preemption (e.g., if a UE 115 has a RSRP for a reference signal from the base station 105-a that is at or below the RSRP threshold, the UE 115 may transmit using sidelink resources), a periodicity of preemption (e.g., periodic resources may be preempted), a resource pool ID of the sidelink resources, or any combinations thereof.

In some cases, the first UE 115-a or the second UE 115-b, in the event that the SPI 235 indicates resources that are to be used for sidelink feedback 230 (e.g., PSFCH resources for HARQ ACK/NACK feedback), may determine to preempt or to transmit the associated transmission. In some cases, SPI 235 may not be applicable to sidelink transmissions on PSFCH, and thus in such cases the first UE 115-a or the second UE 115-b may transmit sidelink feedback 230 irrespective of the SPI 235 (e.g., the SPI 235 may be applied to PSSCH but not to PSFCH). In other cases, SPI 235 may be applied to PSFCH communications regardless of any other factors (e.g., if the SPI 235 indicates PSFCH resources, the PSFCH communication is canceled regardless of associated priorities or other factors). In further cases, SPI 235 may be applied to PSFCH transmissions depending on one or more other factors, such as discussed in more detail herein. In some cases, sidelink UEs 115 may be configured per-UE, per-resource pool, per-carrier, or combinations thereof, to perform PSFCH preemption according to one or more techniques as discussed herein (e.g., the first UE 115-a may be configured to preempt PSFCH based on SPI and the second UE 115-b may be configured to transmit PSFCH irrespective of SPI, or a first carrier may be configured to preempt PSFCH based on SPI and a second carrier may be configured to transmit PSFCH based on one or more factors, etc.).

In cases where SPI 235 is applied to PSFCH communications based on one or more factors, the sidelink feedback 230 may be preempted based on, for example, one or more of a priority of the communication associated with the sidelink feedback 230, a priority indicated by the SPI 235, whether the associated sidelink communication 225 is multicast or unicast (e.g., a cast type of the communication), a RSRP measurement from the base station 105-a and an associated RSRP threshold (e.g., that is provided in configuration information 220), a zone ID indicated by the SPI 235, a resource pool ID indicated by the SPI 235, or any combinations thereof. For example, if the zone ID and resource pool ID are used, the first UE 115-a may preempt the first sidelink feedback 230-a if it is associated with the same zone ID as indicated by the SPI 235 and the same resource pool ID as indicated by the SPI 235. In such an example, if the first sidelink feedback 230-a is associated with a different zone ID or resource pool ID, the first UE 115-a may transmit the PSFCH communication. In another example, if a priority and a RSRP threshold are indicated by the SPI 235 and the first UE 115-a has first sidelink feedback 230-a to transmit, the first UE 115-a may determine the RSRP threshold. In some cases, the RSRP threshold may be dependent on a priority of the sidelink communication 225 associated with the first sidelink feedback 225-a and a priority indicated in the SPI (e.g., the UE determines the RSRP threshold for (x, y) where x is the priority of the sidelink packet sent on PSSCH associated with PSFCH and y is the priority indicated by SPI 235). The first UE 115-a may compare a measured RSRP (e.g., of a reference signal received from the base station 105-a) against the RSRP threshold and determine whether the first sidelink feedback 230-a should be preempted or not. In other examples, preemption determination may be based on any one or combination of factors provided in the SPI 235.

In some cases, alternatively or additionally, a sidelink UE 115, such as first UE 115-a, may transmit a sidelink feedback report to a serving base station 105-a using access link feedback resources 245. For example, the first UE 115-a may be operating according to a sidelink unicast and Mode 1 resource allocation, in which sidelink HARQ feedback may be reported to the base station 105-a (e.g., for allocation of future sidelink resources). In some cases, the access link feedback resources 245 may not be impacted by an uplink CI (e.g., due to non-overlapping resources of the high priority access link communication 240 and the access link feedback resources 245). However, the SPI 235 may result in a cancellation of one or more sidelink communications 225 on a PSSCH. For example, the SPI 235 may result in the first UE 115-a not transmitting the first sidelink communications 225-a to the second UE 115-b, and as a result the second UE 115-d may not provide a corresponding feedback indication in the second sidelink feedback 230-b. In other cases, the SPI 235 may result in the second UE 115-b not transmitting the second sidelink feedback 230-b associated with the first sidelink communications 225-a. In some cases, the first UE 115-a may not report the sidelink feedback (e.g., sidelink HARQ ACK/NACK feedback) to the base station 105-a using the access link feedback resources 245, although the first UE 115-a may report other HARQ feedback or other uplink control information (UCI) to the base station 105-a using such resources. In other cases, the first UE 115-a may report a NACK to the base station 105-a in the feedback report. For example, the first UE 115-a may report a NACK in UCI on PUCCH if it knows that the PSFCH is preempted or in case it does not receive a PSFCH (e.g., if the PSFCH resource is preempted, but the first UE 115-a may not know about it due to not decoding the SPI 235). By providing the NACK indication in such situations, a size of the UCI provided by the first UE 115-a may be consistent, and more reliably decoded at the base station 105-a.

Figure 3:
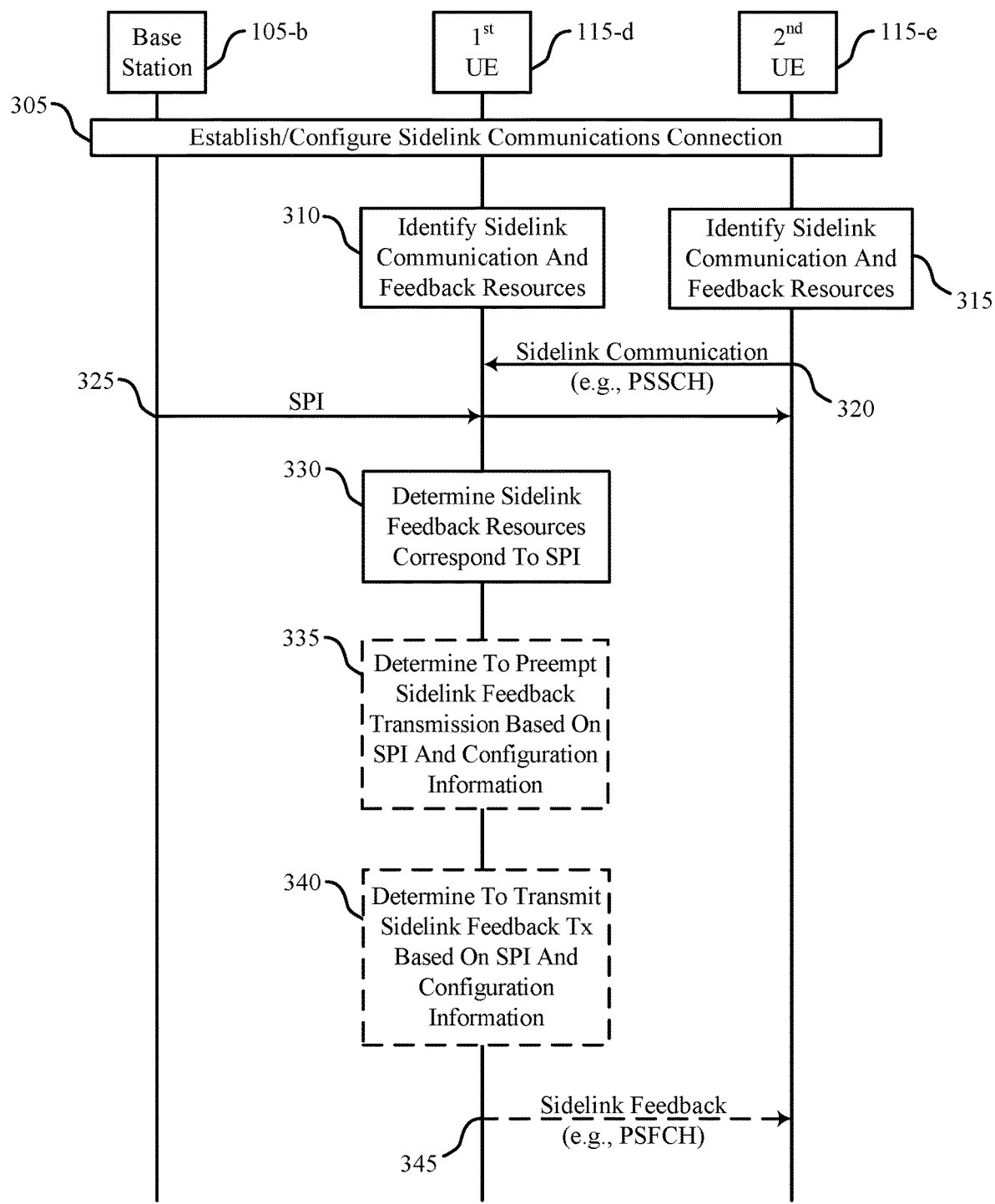
FIG. 3 illustrates an example of a process flow that supports sidelink feedback preemption and uplink multiplexing in wireless communications in accordance with aspects of the present disclosure.

FIG. 3 illustrates an example of a process flow 300 that supports sidelink feedback preemption and uplink multiplexing in wireless communications in accordance with aspects of the present disclosure. In some examples, process flow 300 may implement aspects of wireless communications system 100 or 200. Process flow 300 may be implemented by a first UE 115-d, a second UE 115-e, and a serving base station 105-b, which may be examples of UEs 115 and base stations 105 as described herein. Alternative examples of the following may be implemented, where some steps are performed in a different order than described or are not performed at all. In some cases, steps may include additional features not mentioned below, or further steps may be added.

At 305, the first UE 115-d, second UE 115-e, and base station 105-b may establish and configure a sidelink communications connection between the first UE 115-d and second UE 115-e. In some cases, sidelink communications may be configured by the base station 105-b as part of a sidelink connection establishment, and the configuration may include a configuration for UE-to-UE SPI preemption of sidelink communications. In some cases, the configuration information may be provided in RRC signaling at part of a connection establishment procedure. In some cases, the configuration information may provide information related to SPI priorities for PSFCH and PSSCH communications, RSRP thresholds associated with SPI or different priority communications, UE behavior based on one or more of a cast type, zone ID, resource pool ID, or any combinations thereof, that are indicated in a SPI. In some cases, the configuration information may also indicate a set of sidelink resources, which may include PSSCH and PSFCH resources that occur at an indicated periodicity.

At 310, the first UE 115-d may identify sidelink communication and feedback resources. In some cases, the sidelink communication and feedback resources may be provided with configuration information. In other cases, the sidelink communication and feedback resources may be provided in a grant of sidelink resources, in an indication of a sidelink resource pool, an indication of a resource pool ID (e.g., that identifies one of a number of resource pools that are provided with configuration information), or any combinations thereof. At 315, the second UE 115-e may identify sidelink communication and feedback resources in a similar manner.

At 320, the second UE 115-e may transmit a sidelink communication (e.g., PSSCH) to the first UE 115-d. In some cases, the sidelink communication may have a first priority. The first UE 115-d may receive the sidelink communication and determine whether the communication is successfully or unsuccessfully received and decoded and determine HARQ ACK/NACK feedback associated with the communication.

At 325, the first UE 115-d and the second UE 115-e may receive a SPI from the base station 105-b. In some cases, the SPI may be received in a PDCCH transmission from the base station 105-b. In other cases, the SPI may be received in a broadcast transmission (e.g., a PBCH transmission) from the base station 105-b.

At 330, the first UE 115-d may determine that sidelink resources for reporting feedback associated with the sidelink communication correspond to resources indicated in the SPI. In accordance with techniques as discussed herein, the first UE 115-d may determine to transmit or to preempt transmission of the sidelink feedback based on the SPI. In some cases, at 335, the first UE 115-d may determine to preempt the sidelink feedback transmission based on the SPI and the configuration information. Such a preemption may be determined in accordance with techniques as discussed herein (e.g., based on a priority of the sidelink communication, a priority indicated in the SPI, a RSRP threshold, a cast type, a zone ID, a resource pool ID, or any combinations thereof). In other cases, at 340, the first UE 115-d may determine to transmit the sidelink feedback based on the SPI and the configuration information, and at 345 may transmit the sidelink feedback (e.g., in a PSFCH transmission). In some cases, such a determination to transmit the sidelink feedback may be made in accordance with techniques as discussed herein.

Figure 4:
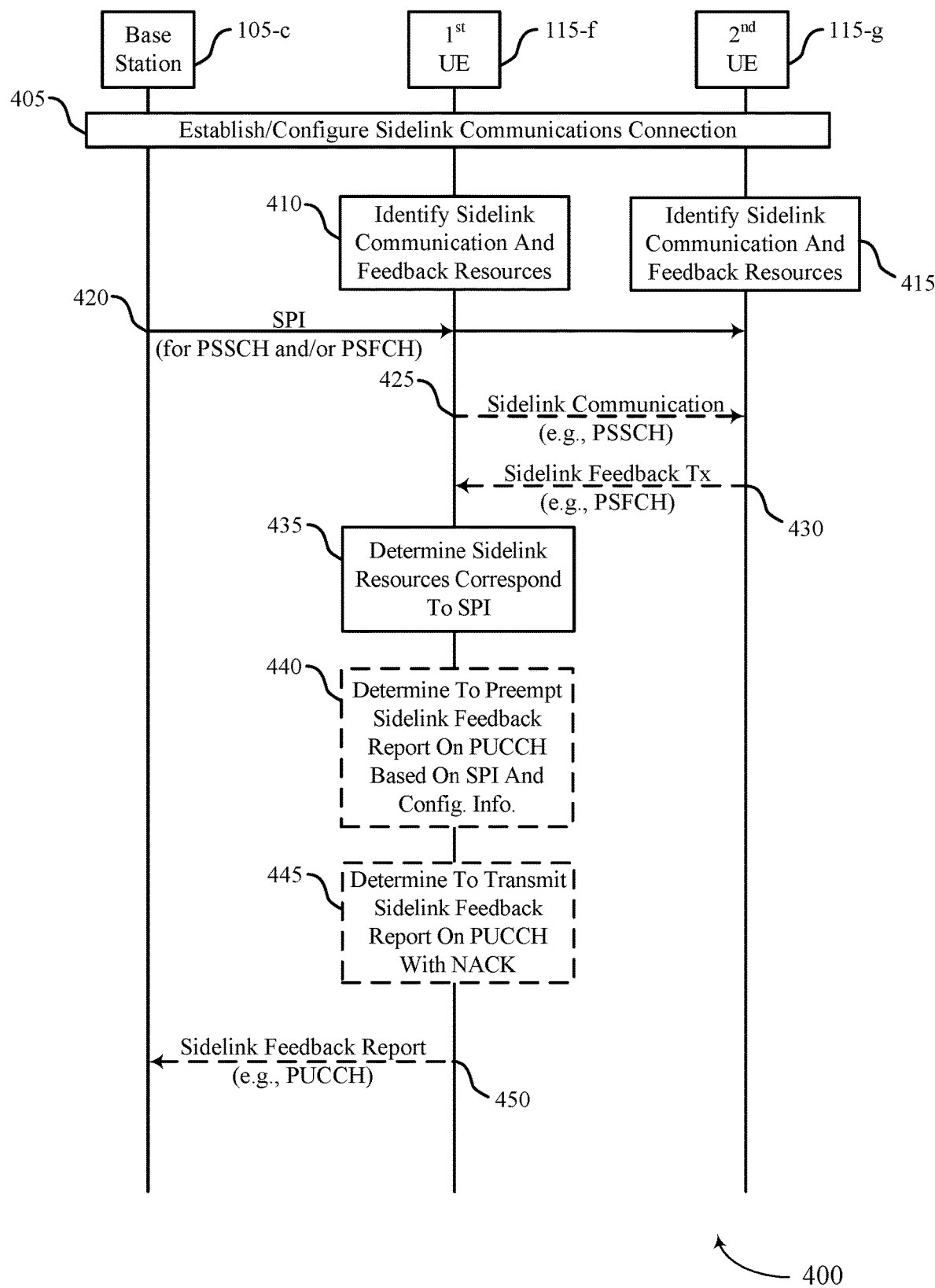
FIG. 4 illustrates an example of a process flow that supports sidelink feedback preemption and uplink multiplexing in wireless communications in accordance with aspects of the present disclosure.

FIG. 4 illustrates an example of a process flow 400 that supports sidelink feedback preemption and uplink multiplexing in wireless communications in accordance with aspects of the present disclosure. In some examples, process flow 400 may implement aspects of wireless communications system 100 or 200. Process flow 400 may be implemented by a first UE 115-f, a second UE 115-g, and a serving base station 105-c, which may be examples of UEs 115 and base stations 105 as described herein. Alternative examples of the following may be implemented, where some steps are performed in a different order than described or are not performed at all. In some cases, steps may include additional features not mentioned below, or further steps may be added.

At 405, the first UE 115-f, second UE 115-g, and base station 105-c may establish and configure a sidelink communications connection between the first UE 115-f and second UE 115-g. In some cases, sidelink communications may be configured by the base station 105-c as part of a sidelink connection establishment, and the configuration may include a configuration for SPI preemption of sidelink communications. In some cases, the configuration information may be provided in RRC signaling at part of a connection establishment procedure. In some cases, the configuration information may provide information related to SPI priorities for sidelink communications (e.g., PSFCH, PSSCH, PSCCH, or any combinations thereof), RSRP thresholds associated with SPI or different priority communications, UE behavior based on one or more of a cast type, zone ID, resource pool ID, or any combinations thereof, that are indicated in a SPI. In some cases, the configuration information may also indicate a set of sidelink resources, which may include PSSCH, PSCCH, or PSFCH resources, or combinations thereof, that occur at an indicated periodicity.

At 410, the first UE 115-f may identify sidelink communication and feedback resources. In some cases, the sidelink communication and feedback resources may be provided with configuration information. In other cases, the sidelink communication and feedback resources may be provided in a grant of sidelink resources, in an indication of a sidelink resource pool, an indication of a resource pool ID (e.g., that identifies one of a number of resource pools that are provided with configuration information), or any combinations thereof. At 415, the second UE 115-g may identify sidelink communication and feedback resources in a similar manner.

At 420, the first UE 115-f and the second UE 115-g may receive a SPI from the base station 105-c. In some cases, the SPI may be received in a PDCCH transmission from the base station 105-c. In other cases, the SPI may be received in a broadcast transmission (e.g., a PBCH transmission) from the base station 105-c.

At 425, the first UE 115-f may transmit a sidelink communication (e.g., PSSCH or PSCCH) to the second UE 115-g, in cases where the SPI does not preempt such a transmission. In some cases, the sidelink communication may have a first priority. The second UE 115-g, in cases where the sidelink communication is transmitted, may receive the sidelink communication and determine whether the communication is successfully or unsuccessfully received and decoded and determine HARQ ACK/NACK feedback associated with the communication.

At 430, the second UE 115-g may transmit sidelink feedback to the first UE 115-f in cases where the SPI does not preempt such a transmission. For example, the second UE 115-g may determine whether or not the sidelink feedback transmission is to be transmitted in accordance with techniques as discussed herein (e.g., based on a priority of the sidelink communication, a priority indicated in the SPI, a RSRP threshold, a cast type, a zone ID, a resource pool ID, or any combinations thereof). In some cases, one or both of the sidelink communication and the associated feedback transmission may be preempted.

At 435, the first UE 115-f may determine whether sidelink resources (e.g., PSSCH, PSCCH, PSFCH resources, or combinations thereof) associated with the sidelink communications or feedback (or both) correspond to resources associated with the SPI. In some cases. Optionally, at 440, the first UE 115-f in cases where one or more sidelink communications are preempted, may determine to preempt the sidelink feedback transmission to the base station 105-c (e.g., in a PUCCH transmission) based on the SPI and the configuration information. In some cases, the PUCCH transmission to the base station 105-*c* may include only sidelink feedback information associated with preempted sidelink communications, and in such cases the PUCCH transmission may be preempted entirely. In other cases, the first UE 115-*f* may transmit other information in the UCI to the base station 105-*c* (e.g., HARQ ACK/NACK feedback associated with a PDSCH or PDCCH communication, HARQ ACK/NACK feedback associated with sidelink communications there were not preempted, one or more measurement or status reports, etc.), and the sidelink feedback preemption may result in the sidelink feedback information associated with the preempted sidelink communications being dropped from the UCI.

In other cases, at 445, the first UE 115-*f* may optionally determine to transmit the sidelink feedback information to the base station 105-*c* with a NACK indication for sidelink communications that are preempted based on the SPI and the configuration information. In such cases, at 450, the first UE 115-*f* may transmit the sidelink feedback (e.g., in a PUCCH transmission) to the base station 105-*c*. In some cases, providing a NACK indication for sidelink resource that are preempted, or where a PSFCH for a sidelink communication is not received, may provide that the UCI transmission to the base station 105-*c* has an amount of data that is expected by the base station 105-*c*, which may provide for more efficient and reliable decoding (e.g., due to the base station 105-*c* having to perform fewer or no blind decodes for different hypotheses of the UCI size).

Figure 5:
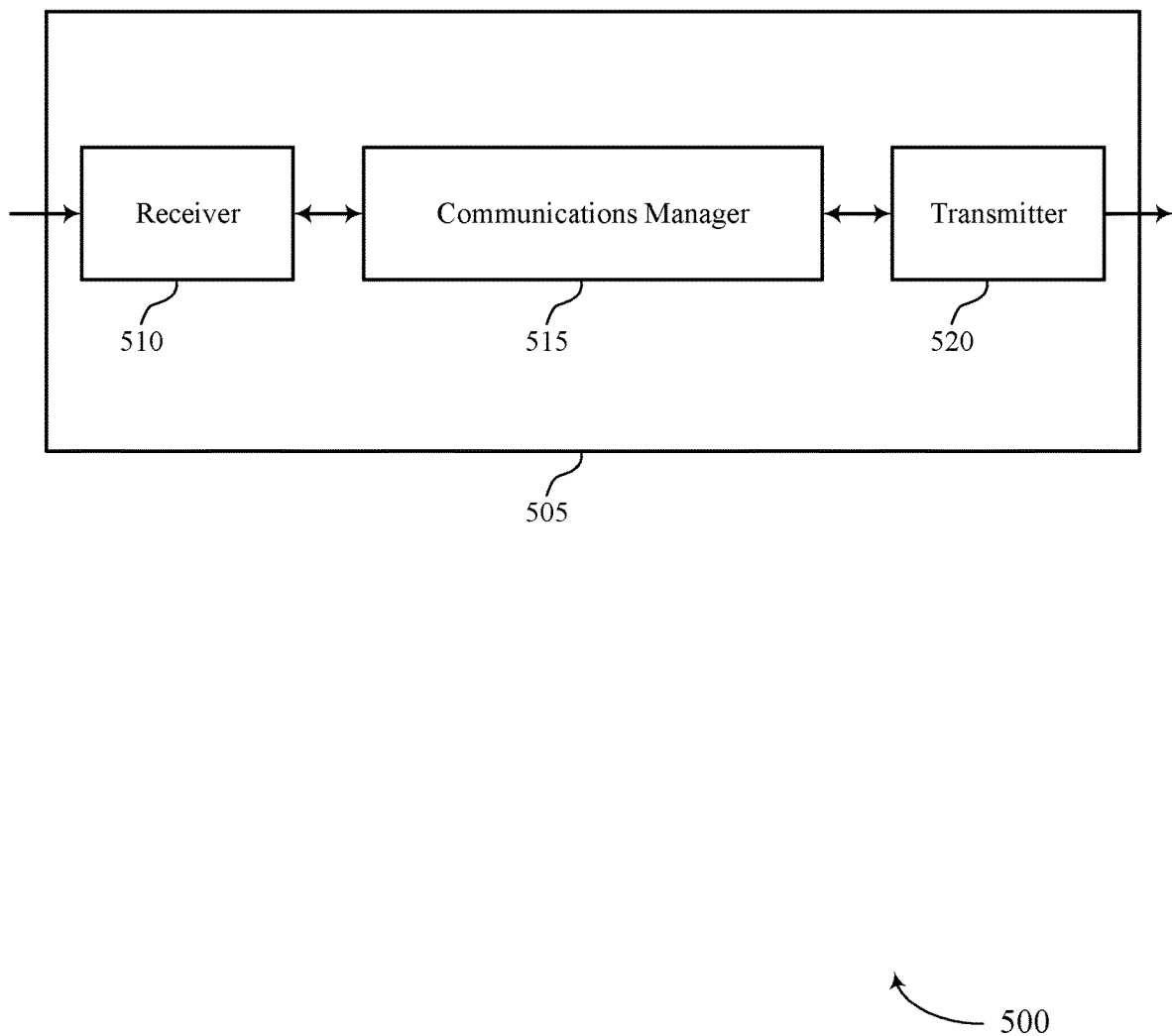
FIGS. 5 and 6 show block diagrams of devices that support sidelink feedback preemption and uplink multiplexing in wireless communications in accordance with aspects of the present disclosure.

FIG. 5 shows a block diagram 500 of a device 505 that supports sidelink feedback preemption and uplink multiplexing in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink feedback preemption and uplink multiplexing in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a sidelink communication from a second UE via a sidelink channel between the first UE and the second UE, identify a set of sidelink feedback resources for a feedback transmission to the second UE, the feedback transmission providing feedback associated with the sidelink communication from the second UE, receive a SPI that indicates one or more sidelink communications between the first UE and the second UE are preempted, and determine whether to transmit the feedback transmission to the second UE via the set of sidelink feedback resources based on the SPI.

The communications manager 515 may also transmit a sidelink communication to a second UE via a sidelink channel between the first UE and the second UE, identify a set of sidelink feedback resources for sidelink feedback from the second UE associated with reception of the sidelink communication at the second UE, receive a SPI that indicates one or more sidelink communications between the first UE and the second UE are preempted, and determine whether to transmit the sidelink feedback from the second UE to a serving base station based on the SPI. The communications manager 515 may be an example of aspects of the communications manager 810 described herein.

The communications manager 515 as described herein may be implemented to realize one or more potential advantages. One implementation may allow the device 505 to determine preemption for one or more sidelink communications, which may include sidelink feedback communications. Such operations may provide improvements to reliability and efficiency in communications with sidelink UEs and with other UEs that may transmit or receive high priority or low latency communications. Such improvements may enhance efficiency of wireless communications at a UE by allowing for flexible allocation of sidelink resources with configurable preemption in the event of other communications that may collide with the sidelink resources. As such, supported techniques may include improved network and UE operations and, in some examples, may promote network efficiencies, reduce latency, and provide network scheduling flexibility, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
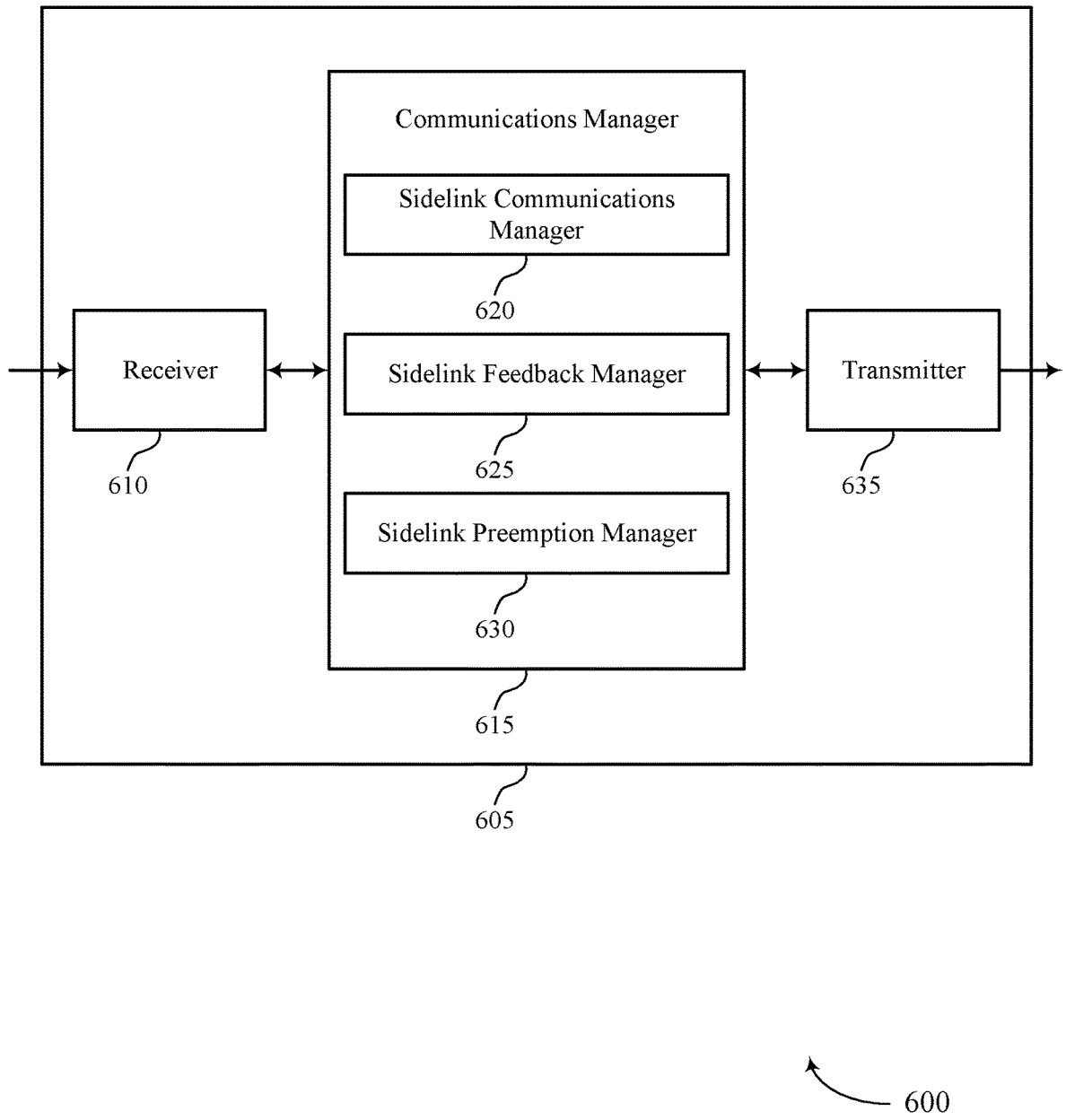

FIG. 6 shows a block diagram 600 of a device 605 that supports sidelink feedback preemption and uplink multiplexing in wireless communications in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to sidelink feedback preemption and uplink multiplexing in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink communications manager 620, a sidelink feedback manager 625, and a sidelink preemption manager 630. The communications manager 615 may be an example of aspects of the communications manager 810 described herein.

In some cases, the sidelink communications manager 620 may receive a sidelink communication from a second UE via a sidelink channel between the first UE and the second UE. The sidelink feedback manager 625 may identify a set of sidelink feedback resources for a feedback transmission to the second UE, the feedback transmission providing feedback associated with the sidelink communication from the second UE. The sidelink preemption manager 630 may receive a SPI that indicates one or more sidelink communications between the first UE and the second UE are preempted and determine whether to transmit the feedback transmission to the second UE via the set of sidelink feedback resources based on the SPI.

In some cases, the sidelink communications manager 620 may transmit a sidelink communication to a second UE via a sidelink channel between the first UE and the second UE. The sidelink feedback manager 625 may identify a set of sidelink feedback resources for sidelink feedback from the second UE associated with reception of the sidelink communication at the second UE. The sidelink preemption manager 630 may receive a SPI that indicates one or more sidelink communications between the first UE and the second UE are preempted and determine whether to transmit the sidelink feedback from the second UE to a serving base station based on the SPI.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
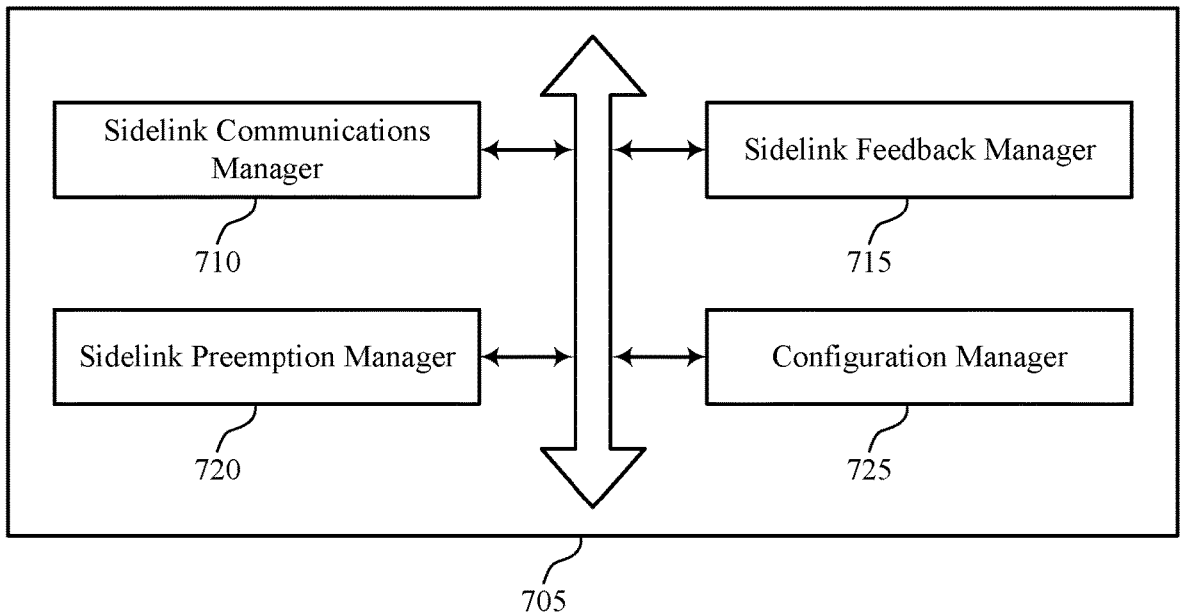
FIG. 7 shows a block diagram of a communications manager that supports sidelink feedback preemption and uplink multiplexing in wireless communications in accordance with aspects of the present disclosure.

FIG. 7 shows a block diagram 700 of a communications manager 705 that supports sidelink feedback preemption and uplink multiplexing in wireless communications in accordance with aspects of the present disclosure. The communications manager 705 may be an example of aspects of a communications manager 515, a communications manager 615, or a communications manager 810 described herein. The communications manager 705 may include a sidelink communications manager 710, a sidelink feedback manager 715, a sidelink preemption manager 720, and a configuration manager 725. Each of these modules may communicate, directly or indirectly, with one another (e.g., via one or more buses).

The sidelink communications manager 710 may receive a sidelink communication from a second UE via a sidelink channel between the first UE and the second UE. In some examples, the sidelink communications manager 710 may transmit a sidelink communication to a second UE via a sidelink channel between the first UE and the second UE. In some examples, the sidelink communications manager 710 may transmit sidelink feedback to the serving base station.

The sidelink feedback manager 715 may identify a set of sidelink feedback resources for a feedback transmission to the second UE, the feedback transmission providing feedback associated with the sidelink communication from the second UE. In some examples, the sidelink feedback manager 715 may identify a set of sidelink feedback resources for sidelink feedback from the second UE associated with reception of the sidelink communication at the second UE. In some examples, the sidelink feedback manager 715 may transmit the feedback transmission via the set of sidelink feedback resources. In some examples, the sidelink feedback manager 715 may transmit or preempt the feedback transmission based on the configuration information. In some cases, a negative acknowledgment indication of the sidelink feedback provides a uniform payload size for an uplink control information transmission to the serving base station that includes the sidelink feedback.

The sidelink preemption manager 720 may receive a SPI that indicates one or more sidelink communications between the first UE and the second UE are preempted. In some examples, the sidelink preemption manager 720 may determine whether to transmit the feedback transmission to the second UE via the set of sidelink feedback resources based on the SPI. In some examples, the sidelink preemption manager 720 may determine whether to transmit the sidelink feedback from the second UE to a serving base station based on the SPI.

In some examples, the sidelink preemption manager 720 may determine that the feedback transmission is to be transmitted when the SPI is associated with the set of sidelink feedback resources. In some examples, the sidelink preemption manager 720 may determine that the feedback transmission is to be preempted when the SPI is associated with the set of sidelink feedback resources. In some examples, the sidelink preemption manager 720 may preempt the feedback transmission via the set of sidelink feedback resources.

In some examples, the sidelink preemption manager 720 may determine to preempt transmission of the sidelink feedback to the serving base station based on the SPI indicating preemption of sidelink resources associated with the sidelink communication or the set of sidelink feedback resources. In some examples, the sidelink preemption manager 720 may set the sidelink feedback from the second UE to indicate a negative acknowledgment based on the SPI indicating preemption of the sidelink resources associated with the sidelink communication. In some examples, the sidelink preemption manager 720 may set the sidelink feedback from the second UE to indicate the negative acknowledgment based on the SPI indicating preemption of the set of sidelink feedback resources or based on an absence of sidelink feedback in the set of sidelink feedback resources.

In some cases, the determining is based on one or more parameters associated with the sidelink communication and one or more corresponding parameters associated with the SPI. In some cases, the one or more parameters include a priority of the sidelink communication, a priority indicated by the SPI, a unicast or multicast transmission type associated with the sidelink communication, a reference signal received power (RSRP) measurement, a zone identification indicated by the SPI, a resource pool identification provided by the ID SPI, or any combinations thereof. In some cases, the RSRP measurement is associated with a reference signal from a serving base station, and where the sidelink feedback transmission is transmitted based on the RSRP being at or below a received power threshold provided with the one or more parameters. In some examples, two or more separate RSRP threshold values are provided for two or more priorities of the SPI, for two or more priorities of the sidelink communication, or any combinations thereof.

In some cases, the SPI provides one or more of a time/frequency indication of the sidelink resources that are to be preempted, a priority associated with the SPI, a zone identification, one or more reference signal received power thresholds for preemption determination, a periodicity of preempted resources, a sidelink resource pool identification, or any combinations thereof.

The configuration manager 725 may receive configuration information that indicates whether feedback transmissions using sidelink feedback resources are to be preempted when the SPI is associated with the set of sidelink feedback resources. In some cases, the configuration information is associated with the first UE, is associated with a resource pool of a set of resource pools, is associated with a carrier of a set of carriers, or any combinations thereof. In some cases, the configuration information is received with a sidelink configuration for the sidelink communications, is received in radio resource control signaling from a serving base station, or any combinations thereof.

Figure 8:
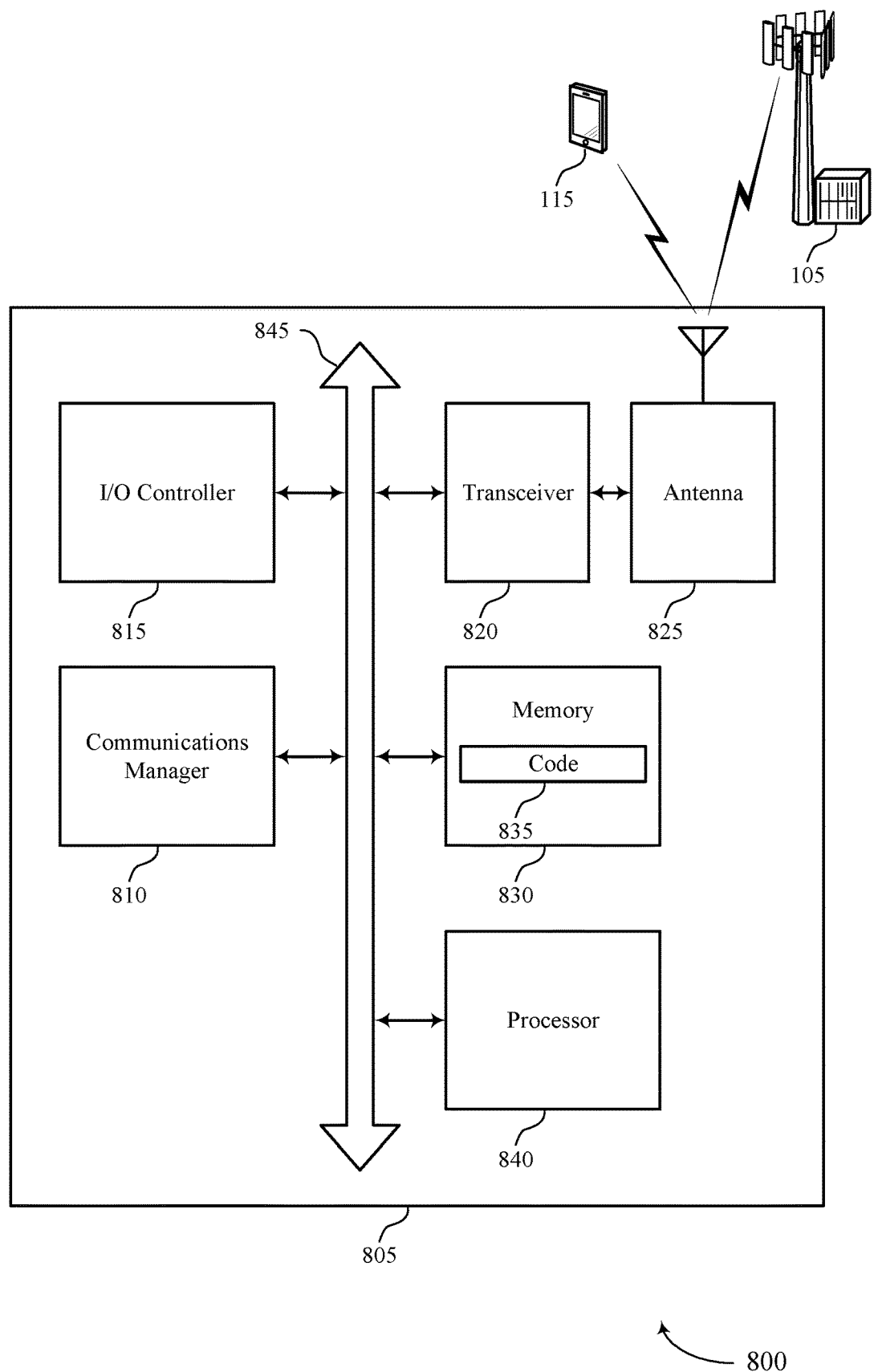
FIG. 8 shows a diagram of a system including a device that supports sidelink feedback preemption and uplink multiplexing in wireless communications in accordance with aspects of the present disclosure.

FIG. 8 shows a diagram of a system 800 including a device 805 that supports sidelink feedback preemption and uplink multiplexing in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some cases, the communications manager 810 may receive a sidelink communication from a second UE via a sidelink channel between the first UE and the second UE, identify a set of sidelink feedback resources for a feedback transmission to the second UE, the feedback transmission providing feedback associated with the sidelink communication from the second UE, receive a SPI that indicates one or more sidelink communications between the first UE and the second UE are preempted, and determine whether to transmit the feedback transmission to the second UE via the set of sidelink feedback resources based on the SPI.

In some cases, the communications manager 810 may also transmit a sidelink communication to a second UE via a sidelink channel between the first UE and the second UE, identify a set of sidelink feedback resources for sidelink feedback from the second UE associated with reception of the sidelink communication at the second UE, receive a SPI that indicates one or more sidelink communications between the first UE and the second UE are preempted, and determine whether to transmit the sidelink feedback from the second UE to a serving base station based on the SPI.

The communications manager 810 as described herein may be implemented to realize one or more potential advantages. One implementation may allow the device 805 to determine preemption for one or more sidelink communications, which may include sidelink feedback communications. Such operations may provide improvements to reliability and efficiency in communications with sidelink UEs and with other UEs that may transmit or receive high priority or low latency communications. Such improvements may enhance efficiency of wireless communications at a UE by allowing for flexible allocation of sidelink resources with configurable preemption in the event of other communications that may collide with the sidelink resources. As such, supported techniques may include improved network and UE operations and, in some examples, may promote network efficiencies, reduce latency, and provide network scheduling flexibility, among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink feedback preemption and uplink multiplexing in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
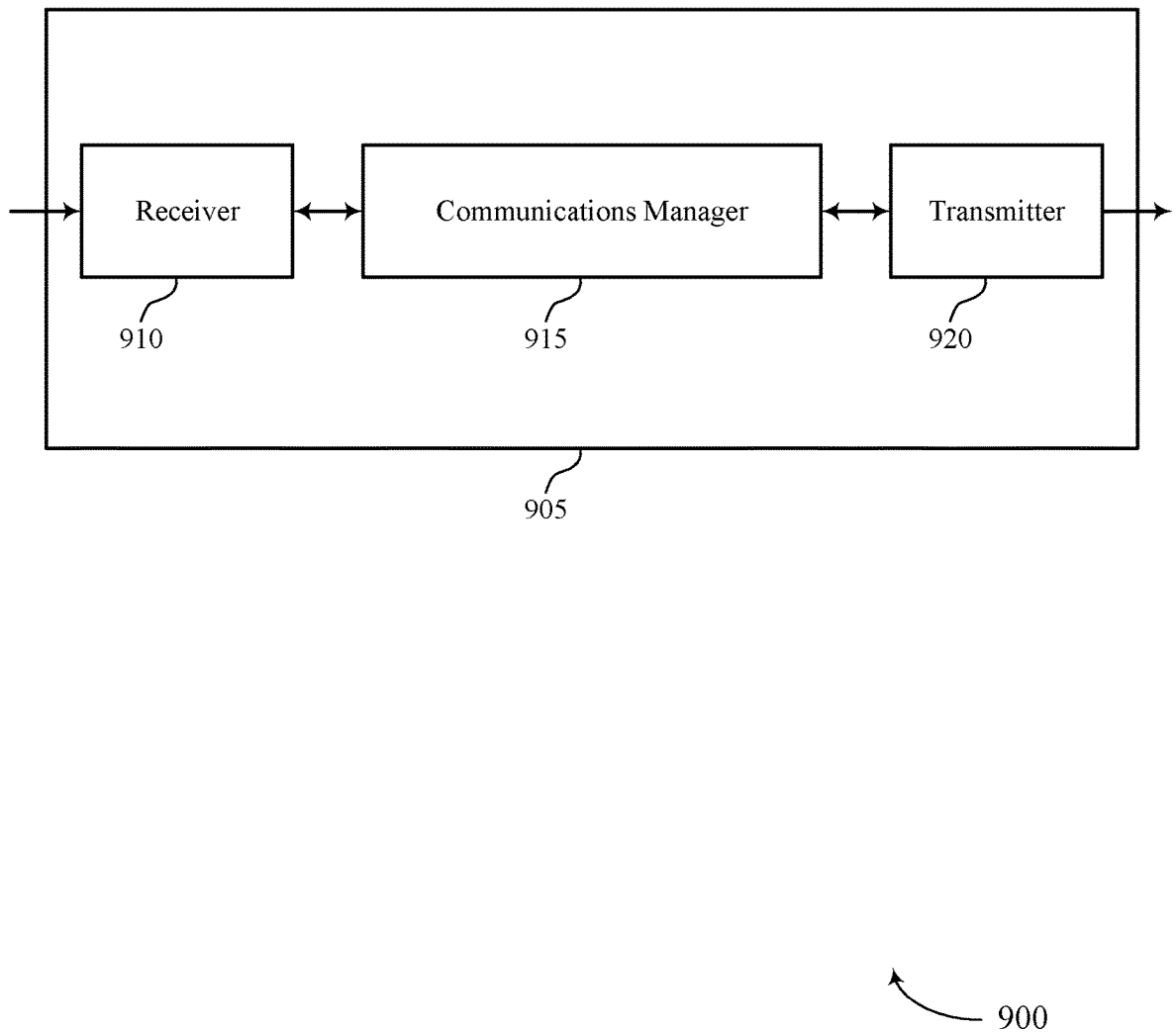
FIGS. 9 and 10 show block diagrams of devices that support sidelink feedback preemption and uplink multiplexing in wireless communications in accordance with aspects of the present disclosure.

FIG. 9 shows a block diagram 900 of a device 905 that supports sidelink feedback preemption and uplink multiplexing in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sidelink feedback preemption and uplink multiplexing in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit configuration information to one or more UEs that indicates whether feedback transmissions using sidelink feedback resources are to be preempted when a SPI is associated with a set of sidelink feedback resources, transmit a SPI that indicates one or more sidelink communications between the one or more UEs are preempted, and monitor for sidelink feedback from the one or more UEs based on the SPI. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
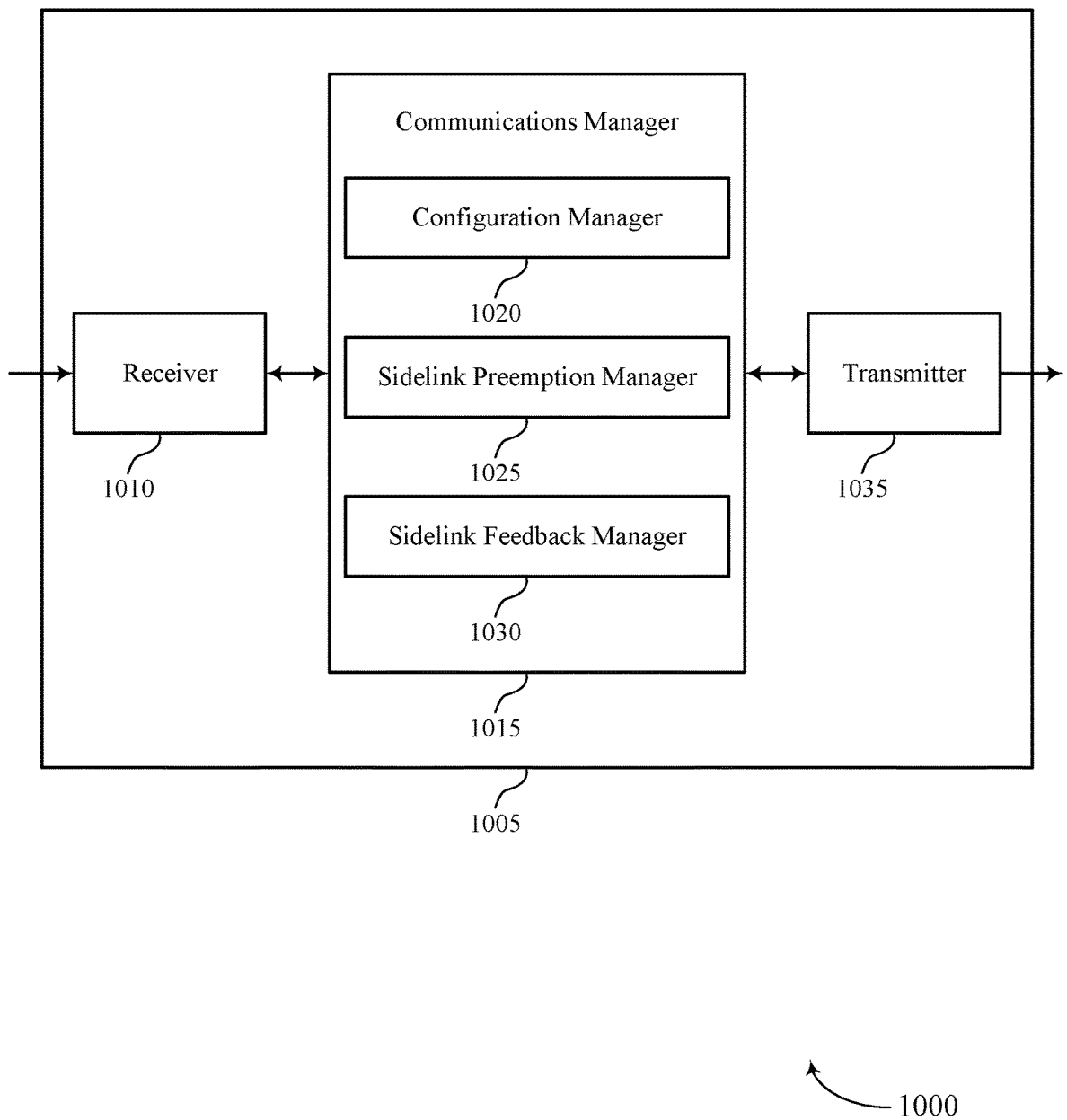

FIG. 10 shows a block diagram 1000 of a device 1005 that supports sidelink feedback preemption and uplink multiplexing in wireless communications in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink feedback preemption and uplink multiplexing in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a sidelink preemption manager 1025, and a sidelink feedback manager 1030. The communications manager 1015 may be an example of aspects of the communications manager 1210 described herein.

The configuration manager 1020 may transmit configuration information to one or more UEs that indicates whether feedback transmissions using sidelink feedback resources are to be preempted when a SPI is associated with a set of sidelink feedback resources.

The sidelink preemption manager 1025 may transmit a SPI that indicates one or more sidelink communications between the one or more UEs are preempted.

The sidelink feedback manager 1030 may monitor for sidelink feedback from the one or more UEs based on the SPI.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
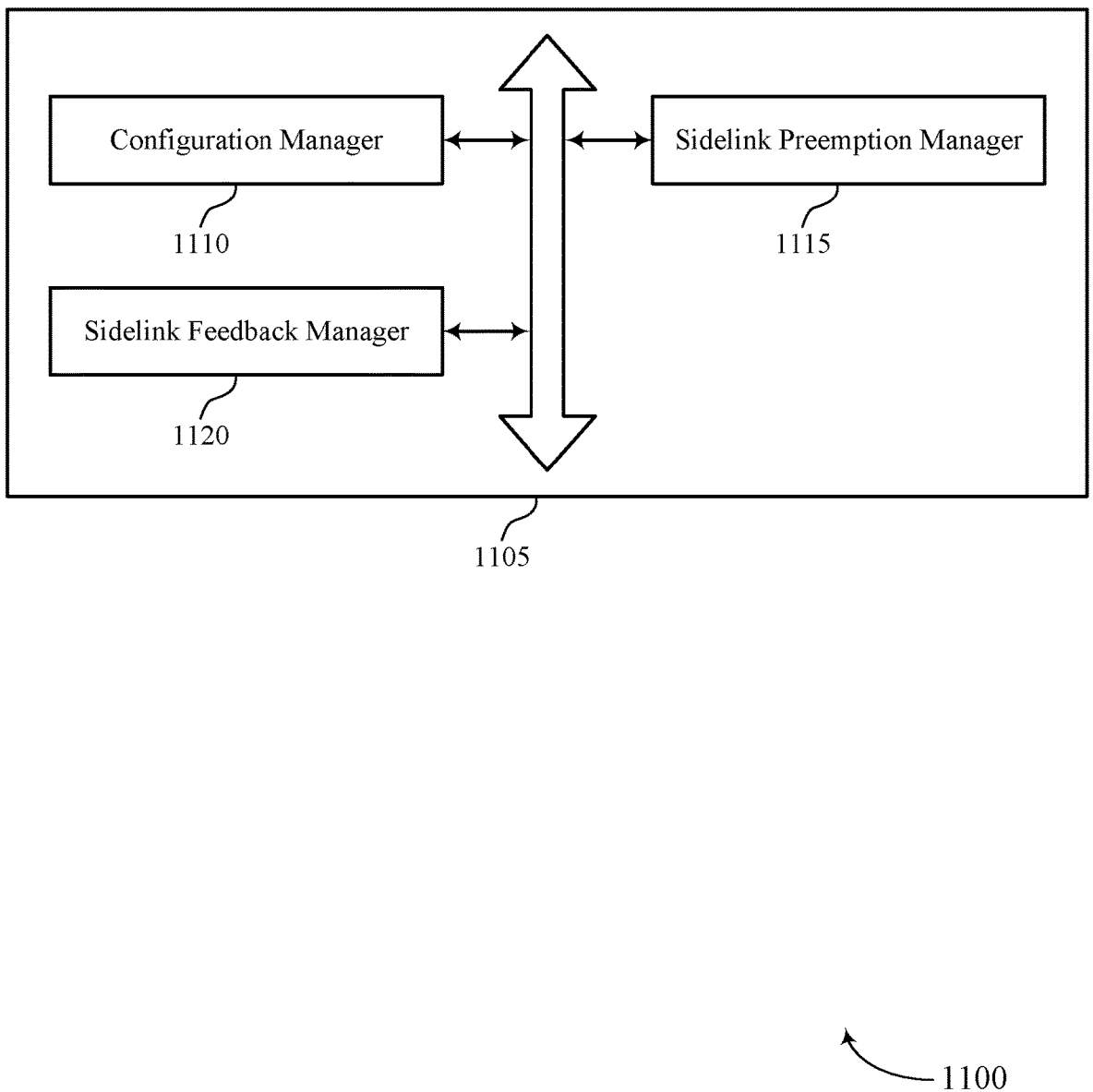
FIG. 11 shows a block diagram of a communications manager that supports sidelink feedback preemption and uplink multiplexing in wireless communications in accordance with aspects of the present disclosure.

FIG. 11 shows a block diagram 1100 of a communications manager 1105 that supports sidelink feedback preemption and uplink multiplexing in wireless communications in accordance with aspects of the present disclosure. The communications manager 1105 may be an example of aspects of a communications manager 915, a communications manager 1015, or a communications manager 1210 described herein. The communications manager 1105 may include a configuration manager 1110, a sidelink preemption manager 1115, and a sidelink feedback manager 1120. Each of these modules may communicate, directly or indirectly, with one another (e.g., via one or more buses).

The configuration manager 1110 may transmit configuration information to one or more UEs that indicates whether feedback transmissions using sidelink feedback resources are to be preempted when a SPI is associated with a set of sidelink feedback resources.

The sidelink preemption manager 1115 may transmit a SPI that indicates one or more sidelink communications between the one or more UEs are preempted. In some cases, the SPI provides one or more of a time/frequency indication of the sidelink resources that are to be preempted, a priority associated with the SPI, a zone identification, one or more reference signal received power thresholds for preemption determination, a periodicity of preempted resources, a sidelink resource pool identification, or any combinations thereof.

The sidelink feedback manager 1120 may monitor for sidelink feedback from the one or more UEs based on the SPI. In some cases, the sidelink feedback indicates a negative acknowledgment based on the SPI. In some cases, the sidelink feedback from the one or more UEs indicates negative acknowledgment based on the SPI indicating preemption of the set of sidelink feedback resources or based on an absence of sidelink feedback in the set of sidelink feedback resources. In some cases, the negative acknowledgment indication of the sidelink feedback provides a uniform payload size for an uplink control information transmission to the base station that includes the sidelink feedback.

Figure 12:
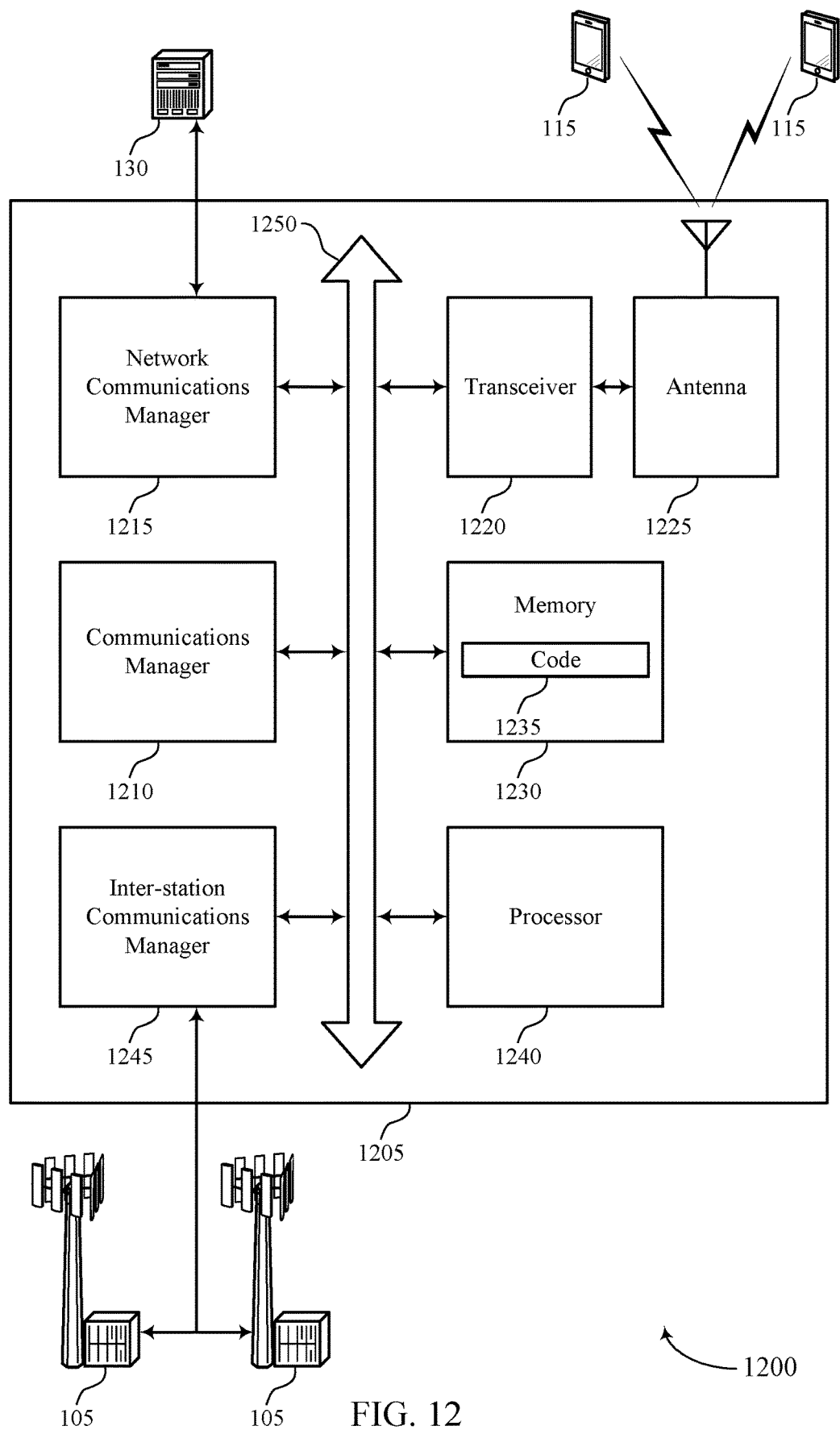
FIG. 12 shows a diagram of a system including a device that supports sidelink feedback preemption and uplink multiplexing in wireless communications in accordance with aspects of the present disclosure.

FIG. 12 shows a diagram of a system 1200 including a device 1205 that supports sidelink feedback preemption and uplink multiplexing in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit configuration information to one or more UEs that indicates whether feedback transmissions using sidelink feedback resources are to be preempted when a SPI is associated with a set of sidelink feedback resources, transmit a SPI that indicates one or more sidelink communications between the one or more UEs are preempted, and monitor for sidelink feedback from the one or more UEs based on the SPI.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting sidelink feedback preemption and uplink multiplexing in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
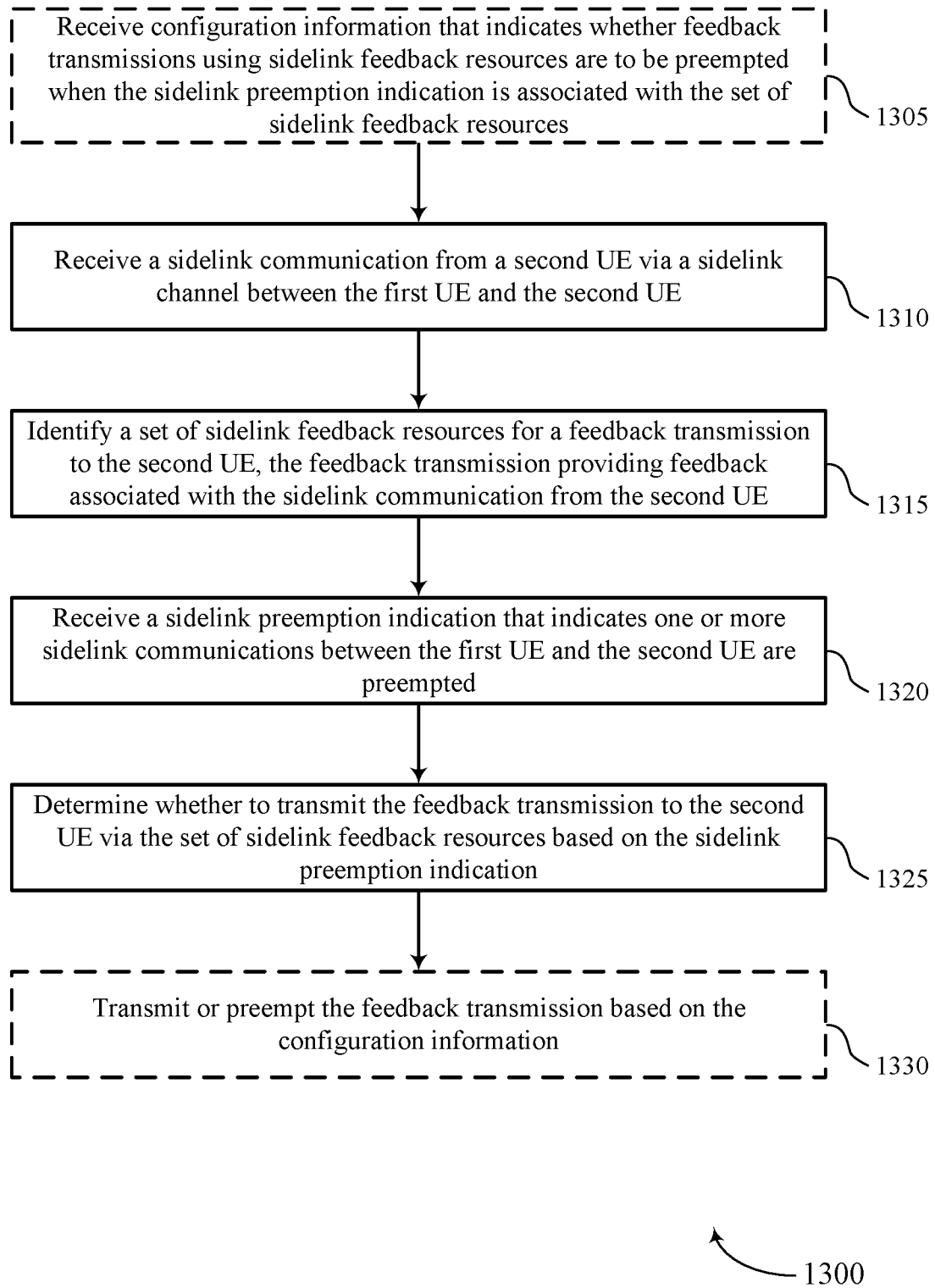
FIGS. 13 through 19 show flowcharts illustrating methods that support sidelink feedback preemption and uplink multiplexing in wireless communications in accordance with aspects of the present disclosure.

FIG. 13 shows a flowchart illustrating a method 1300 that supports sidelink feedback preemption and uplink multiplexing in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

Optionally, at 1305, the UE may receive configuration information that indicates whether feedback transmissions using sidelink feedback resources are to be preempted when the SPI is associated with the set of sidelink feedback resources. The operations of 1305 may be performed according to the methods described herein. In some examples, aspects of the operations of 1305 may be performed by a configuration manager as described with reference to FIGS. 5 through 8.

At 1310, the UE may receive a sidelink communication from a second UE via a sidelink channel between the first UE and the second UE. The operations of 1310 may be performed according to the methods described herein. In some examples, aspects of the operations of 1310 may be performed by a sidelink communications manager as described with reference to FIGS. 5 through 8.

At 1315, the UE may identify a set of sidelink feedback resources for a feedback transmission to the second UE, the feedback transmission providing feedback associated with the sidelink communication from the second UE. The operations of 1315 may be performed according to the methods described herein. In some examples, aspects of the operations of 1315 may be performed by a sidelink feedback manager as described with reference to FIGS. 5 through 8.

At 1320, the UE may receive a SPI that indicates one or more sidelink communications between the first UE and the second UE are preempted. The operations of 1320 may be performed according to the methods described herein. In some examples, aspects of the operations of 1320 may be performed by a sidelink preemption manager as described with reference to FIGS. 5 through 8.

At 1325, the UE may determine whether to transmit the feedback transmission to the second UE via the set of sidelink feedback resources based on the SPI. The operations of 1325 may be performed according to the methods described herein. In some examples, aspects of the operations of 1325 may be performed by a sidelink preemption manager as described with reference to FIGS. 5 through 8.

Optionally, at 1330, the UE may transmit or preempt the feedback transmission based on the configuration information. The operations of 1330 may be performed according to the methods described herein. In some examples, aspects of the operations of 1330 may be performed by a sidelink feedback manager as described with reference to FIGS. 5 through 8.

Figure 14:
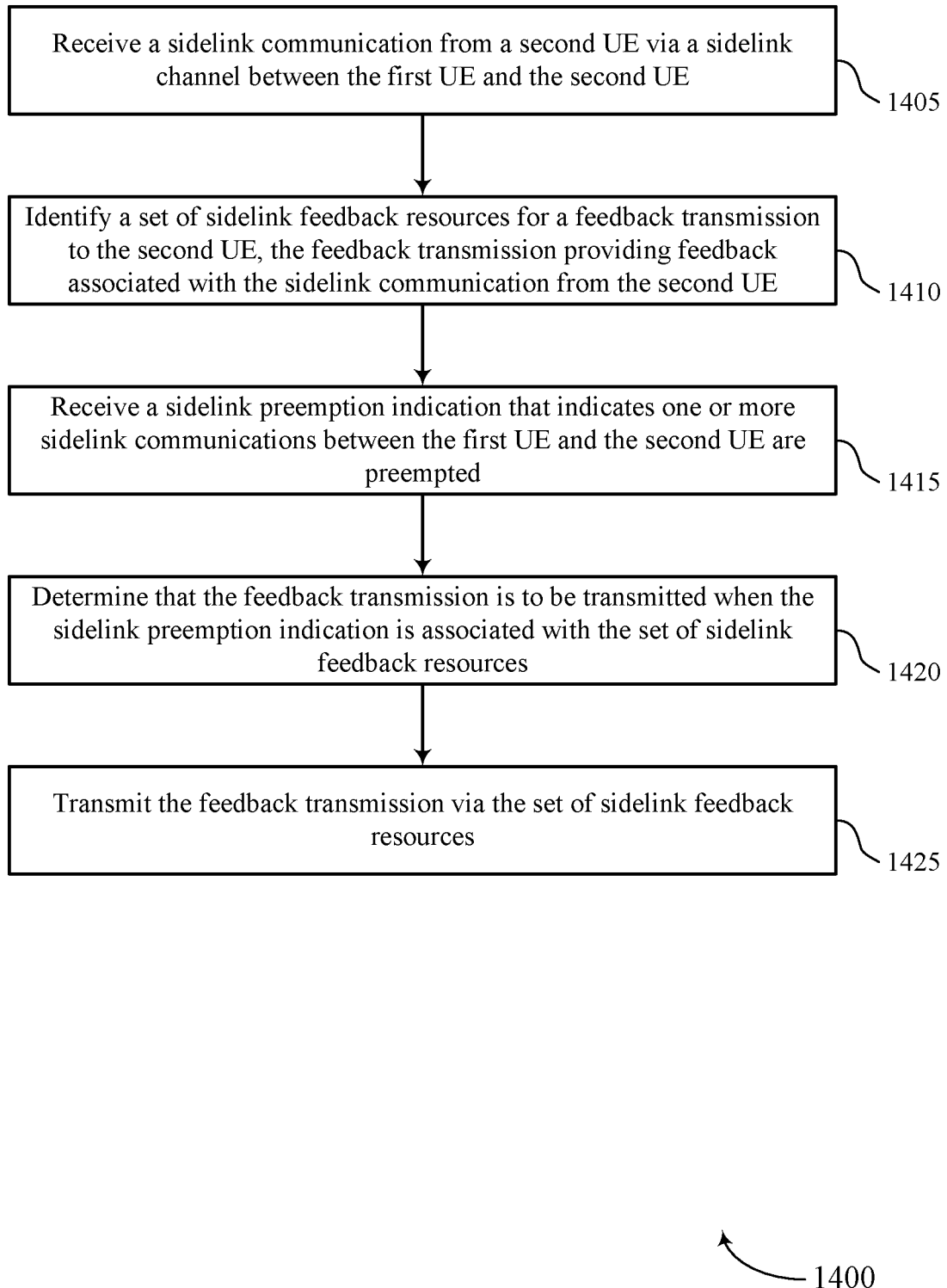

FIG. 14 shows a flowchart illustrating a method 1400 that supports sidelink feedback preemption and uplink multiplexing in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a sidelink communication from a second UE via a sidelink channel between the first UE and the second UE. The operations of 1405 may be performed according to the methods described herein. In some examples, aspects of the operations of 1405 may be performed by a sidelink communications manager as described with reference to FIGS. 5 through 8.

At 1410, the UE may identify a set of sidelink feedback resources for a feedback transmission to the second UE, the feedback transmission providing feedback associated with the sidelink communication from the second UE. The operations of 1410 may be performed according to the methods described herein. In some examples, aspects of the operations of 1410 may be performed by a sidelink feedback manager as described with reference to FIGS. 5 through 8.

At 1415, the UE may receive a SPI that indicates one or more sidelink communications between the first UE and the second UE are preempted. The operations of 1415 may be performed according to the methods described herein. In some examples, aspects of the operations of 1415 may be performed by a sidelink preemption manager as described with reference to FIGS. 5 through 8.

At 1420, the UE may determine that the feedback transmission is to be transmitted when the SPI is associated with the set of sidelink feedback resources. The operations of 1420 may be performed according to the methods described herein. In some examples, aspects of the operations of 1420 may be performed by a sidelink preemption manager as described with reference to FIGS. 5 through 8.

At 1425, the UE may transmit the feedback transmission via the set of sidelink feedback resources. The operations of 1425 may be performed according to the methods described herein. In some examples, aspects of the operations of 1425 may be performed by a sidelink feedback manager as described with reference to FIGS. 5 through 8.

Figure 15:
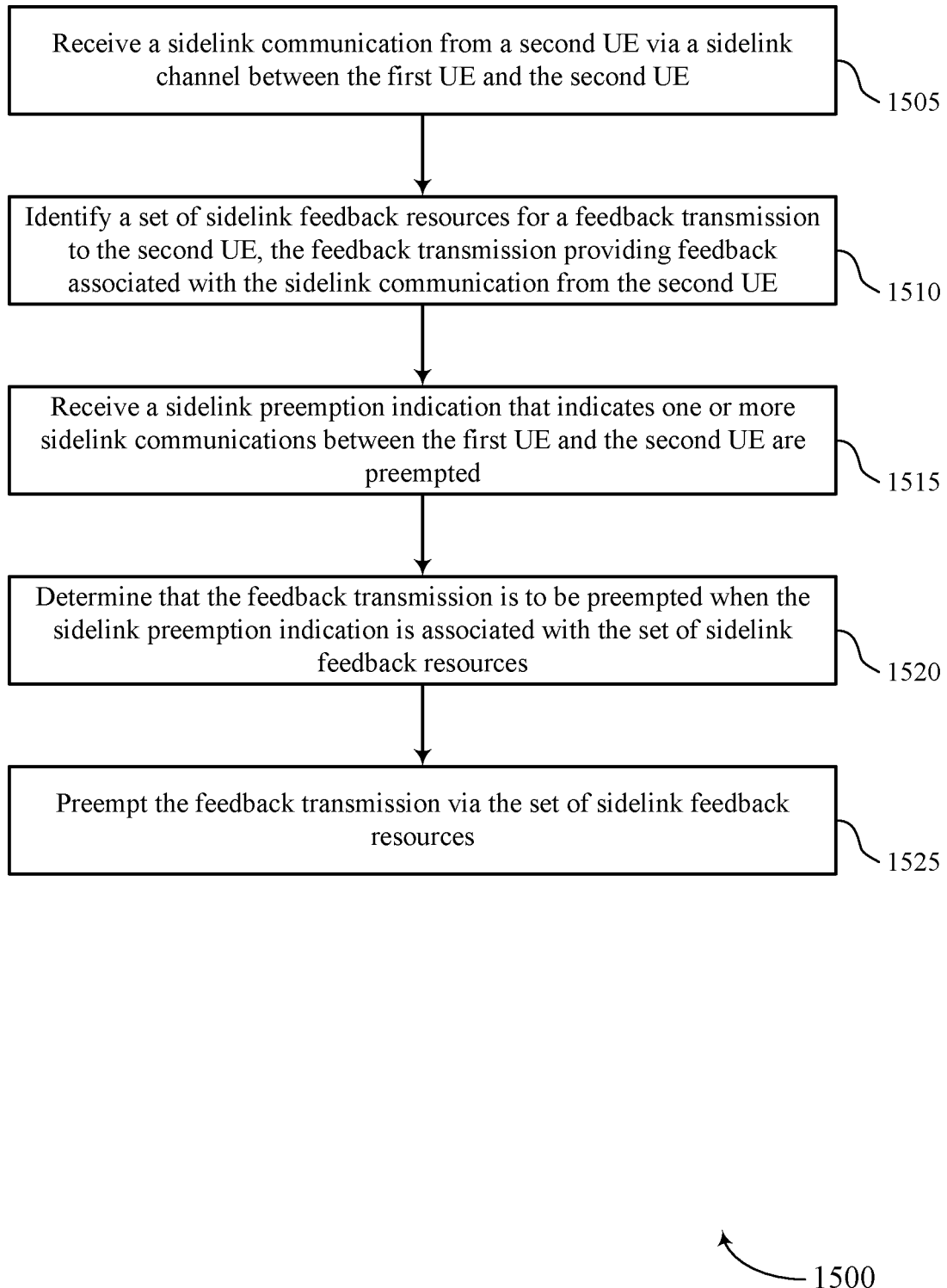

FIG. 15 shows a flowchart illustrating a method 1500 that supports sidelink feedback preemption and uplink multiplexing in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a sidelink communication from a second UE via a sidelink channel between the first UE and the second UE. The operations of 1505 may be performed according to the methods described herein. In some examples, aspects of the operations of 1505 may be performed by a sidelink communications manager as described with reference to FIGS. 5 through 8.

At 1510, the UE may identify a set of sidelink feedback resources for a feedback transmission to the second UE, the feedback transmission providing feedback associated with the sidelink communication from the second UE. The operations of 1510 may be performed according to the methods described herein. In some examples, aspects of the operations of 1510 may be performed by a sidelink feedback manager as described with reference to FIGS. 5 through 8.

At 1515, the UE may receive a SPI that indicates one or more sidelink communications between the first UE and the second UE are preempted. The operations of 1515 may be performed according to the methods described herein. In some examples, aspects of the operations of 1515 may be performed by a sidelink preemption manager as described with reference to FIGS. 5 through 8.

At 1520, the UE may determine that the feedback transmission is to be preempted when the SPI is associated with the set of sidelink feedback resources. The operations of 1520 may be performed according to the methods described herein. In some examples, aspects of the operations of 1520 may be performed by a sidelink preemption manager as described with reference to FIGS. 5 through 8.

At 1525, the UE may preempt the feedback transmission via the set of sidelink feedback resources. The operations of 1525 may be performed according to the methods described herein. In some examples, aspects of the operations of 1525 may be performed by a sidelink preemption manager as described with reference to FIGS. 5 through 8.

Figure 16:
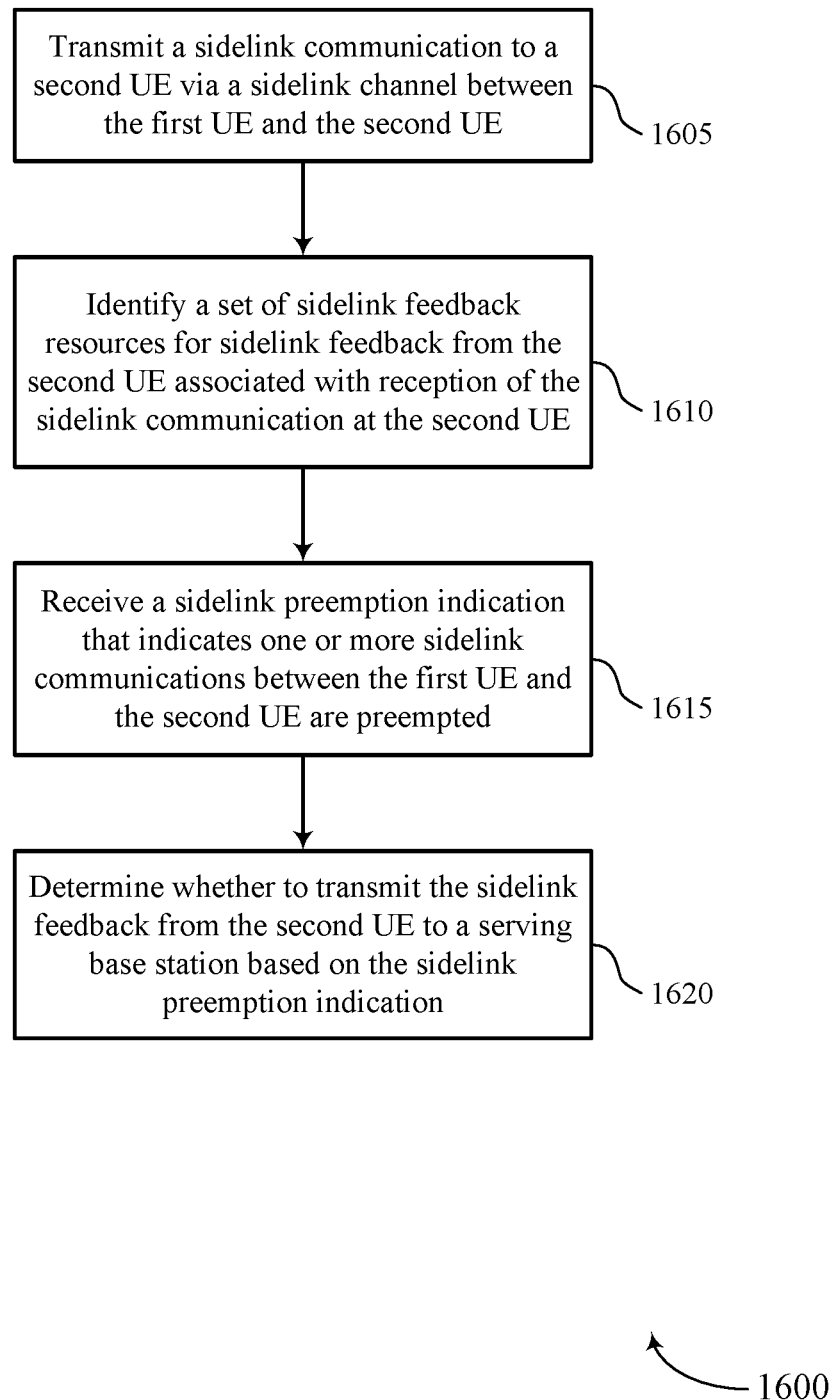

FIG. 16 shows a flowchart illustrating a method 1600 that supports sidelink feedback preemption and uplink multiplexing in wireless communications in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may transmit a sidelink communication to a second UE via a sidelink channel between the first UE and the second UE. The operations of 1605 may be performed according to the methods described herein. In some examples, aspects of the operations of 1605 may be performed by a sidelink communications manager as described with reference to FIGS. 5 through 8.

At 1610, the UE may identify a set of sidelink feedback resources for sidelink feedback from the second UE associated with reception of the sidelink communication at the second UE. The operations of 1610 may be performed according to the methods described herein. In some examples, aspects of the operations of 1610 may be performed by a sidelink feedback manager as described with reference to FIGS. 5 through 8.

At 1615, the UE may receive a SPI that indicates one or more sidelink communications between the first UE and the second UE are preempted. The operations of 1615 may be performed according to the methods described herein. In some examples, aspects of the operations of 1615 may be performed by a sidelink preemption manager as described with reference to FIGS. 5 through 8.

At 1620, the UE may determine whether to transmit the sidelink feedback from the second UE to a serving base station based on the SPI. The operations of 1620 may be performed according to the methods described herein. In some examples, aspects of the operations of 1620 may be performed by a sidelink preemption manager as described with reference to FIGS. 5 through 8.

Figure 17:
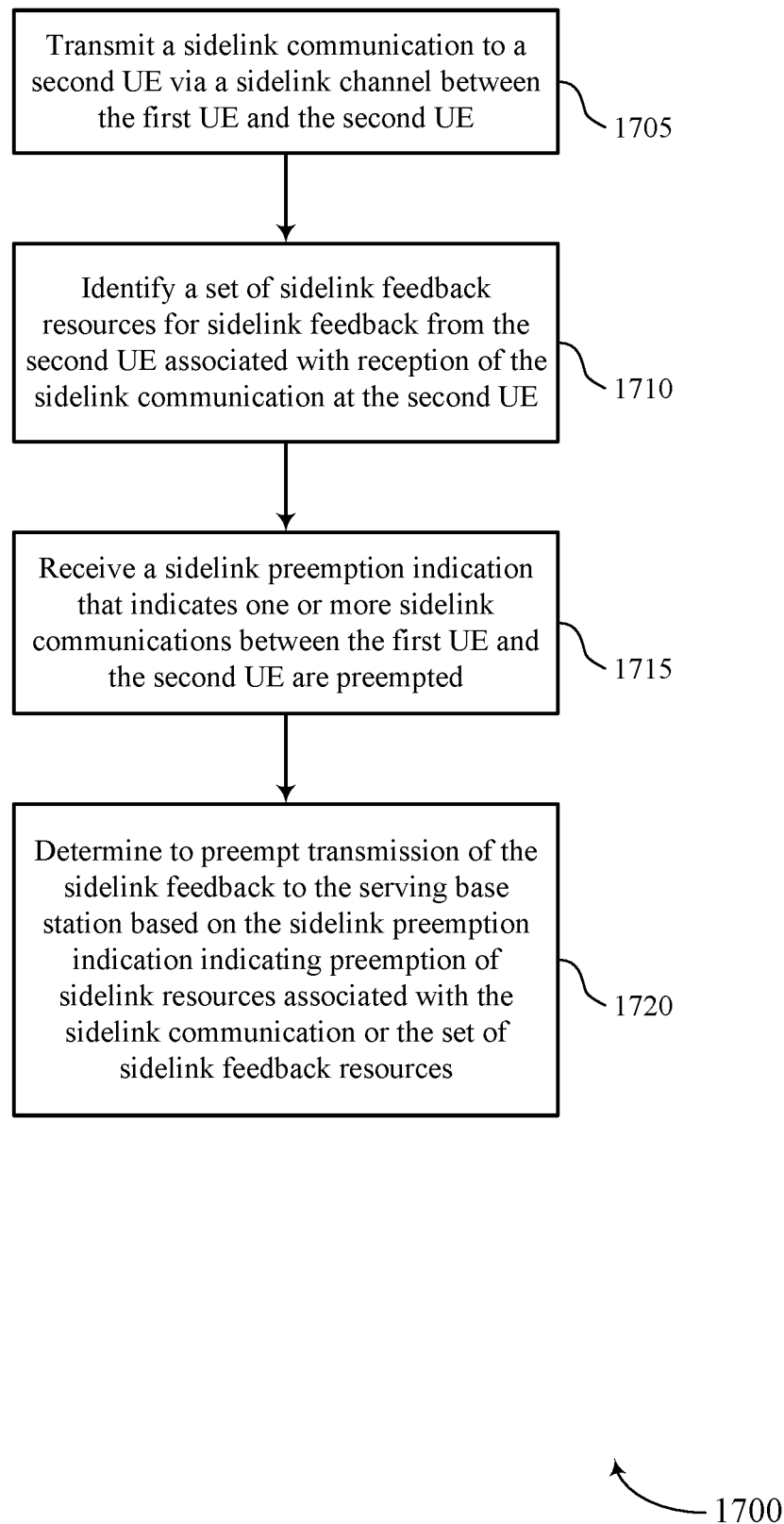

FIG. 17 shows a flowchart illustrating a method 1700 that supports sidelink feedback preemption and uplink multiplexing in wireless communications in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may transmit a sidelink communication to a second UE via a sidelink channel between the first UE and the second UE. The operations of 1705 may be performed according to the methods described herein. In some examples, aspects of the operations of 1705 may be performed by a sidelink communications manager as described with reference to FIGS. 5 through 8.

At 1710, the UE may identify a set of sidelink feedback resources for sidelink feedback from the second UE associated with reception of the sidelink communication at the second UE. The operations of 1710 may be performed according to the methods described herein. In some examples, aspects of the operations of 1710 may be performed by a sidelink feedback manager as described with reference to FIGS. 5 through 8.

At 1715, the UE may receive a SPI that indicates one or more sidelink communications between the first UE and the second UE are preempted. The operations of 1715 may be performed according to the methods described herein. In some examples, aspects of the operations of 1715 may be performed by a sidelink preemption manager as described with reference to FIGS. 5 through 8.

At 1720, the UE may determine to preempt transmission of the sidelink feedback to the serving base station based on the SPI indicating preemption of sidelink resources associated with the sidelink communication or the set of sidelink feedback resources. The operations of 1720 may be performed according to the methods described herein. In some examples, aspects of the operations of 1720 may be performed by a sidelink preemption manager as described with reference to FIGS. 5 through 8.

Figure 18:
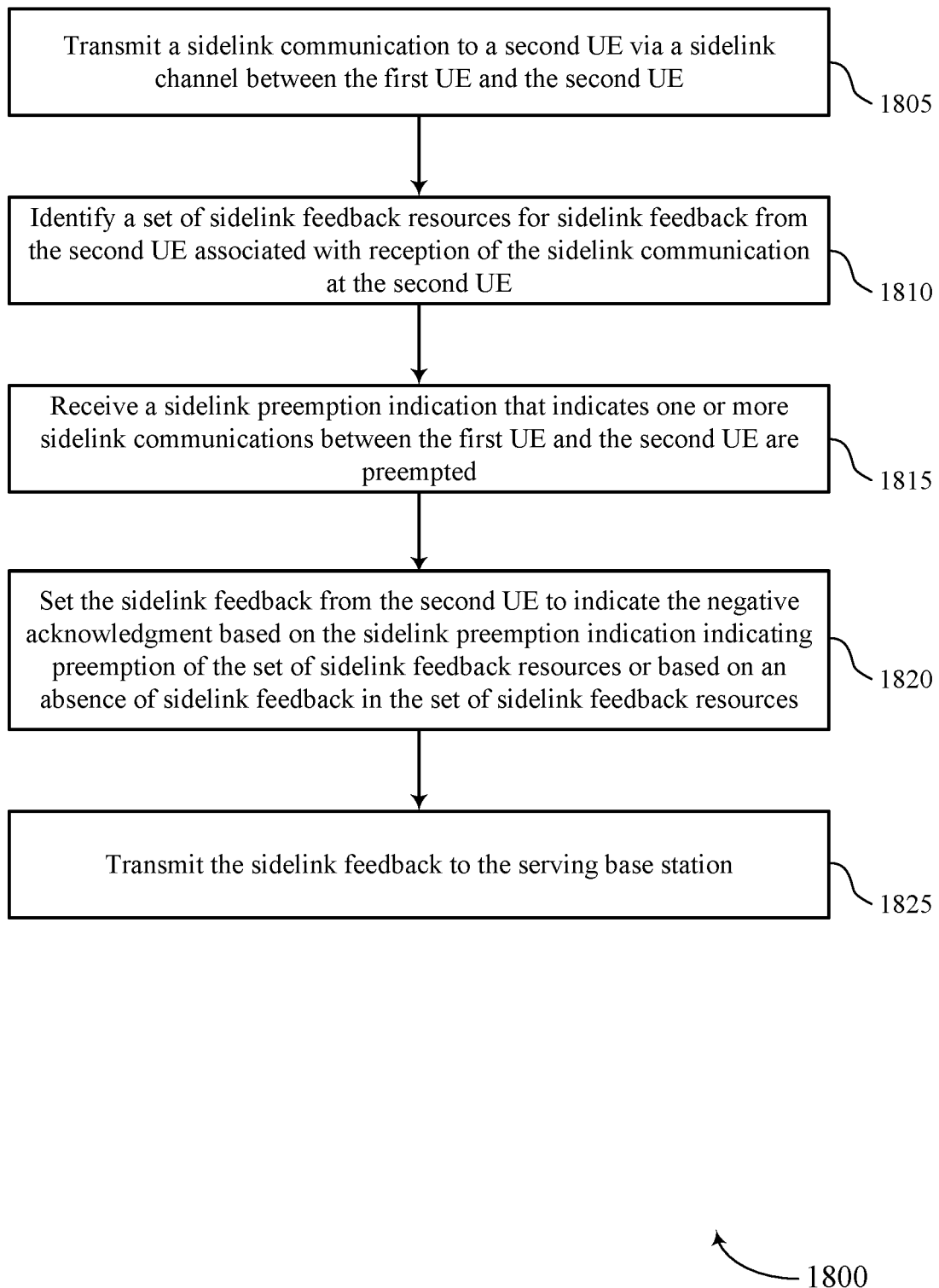

FIG. 18 shows a flowchart illustrating a method 1800 that supports sidelink feedback preemption and uplink multiplexing in wireless communications in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may transmit a sidelink communication to a second UE via a sidelink channel between the first UE and the second UE. The operations of 1805 may be performed according to the methods described herein. In some examples, aspects of the operations of 1805 may be performed by a sidelink communications manager as described with reference to FIGS. 5 through 8.

At 1810, the UE may identify a set of sidelink feedback resources for sidelink feedback from the second UE associated with reception of the sidelink communication at the second UE. The operations of 1810 may be performed according to the methods described herein. In some examples, aspects of the operations of 1810 may be performed by a sidelink feedback manager as described with reference to FIGS. 5 through 8.

At 1815, the UE may receive a SPI that indicates one or more sidelink communications between the first UE and the second UE are preempted. The operations of 1815 may be performed according to the methods described herein. In some examples, aspects of the operations of 1815 may be performed by a sidelink preemption manager as described with reference to FIGS. 5 through 8.

At 1820, the UE may set the sidelink feedback from the second UE to indicate the negative acknowledgment based on the SPI indicating preemption of the set of sidelink feedback resources or based on an absence of sidelink feedback in the set of sidelink feedback resources. The operations of 1820 may be performed according to the methods described herein. In some examples, aspects of the operations of 1820 may be performed by a sidelink preemption manager as described with reference to FIGS. 5 through 8.

At 1825, the UE may transmit the sidelink feedback to the serving base station. The operations of 1825 may be performed according to the methods described herein. In some examples, aspects of the operations of 1825 may be performed by a sidelink communications manager as described with reference to FIGS. 5 through 8.

Figure 19:
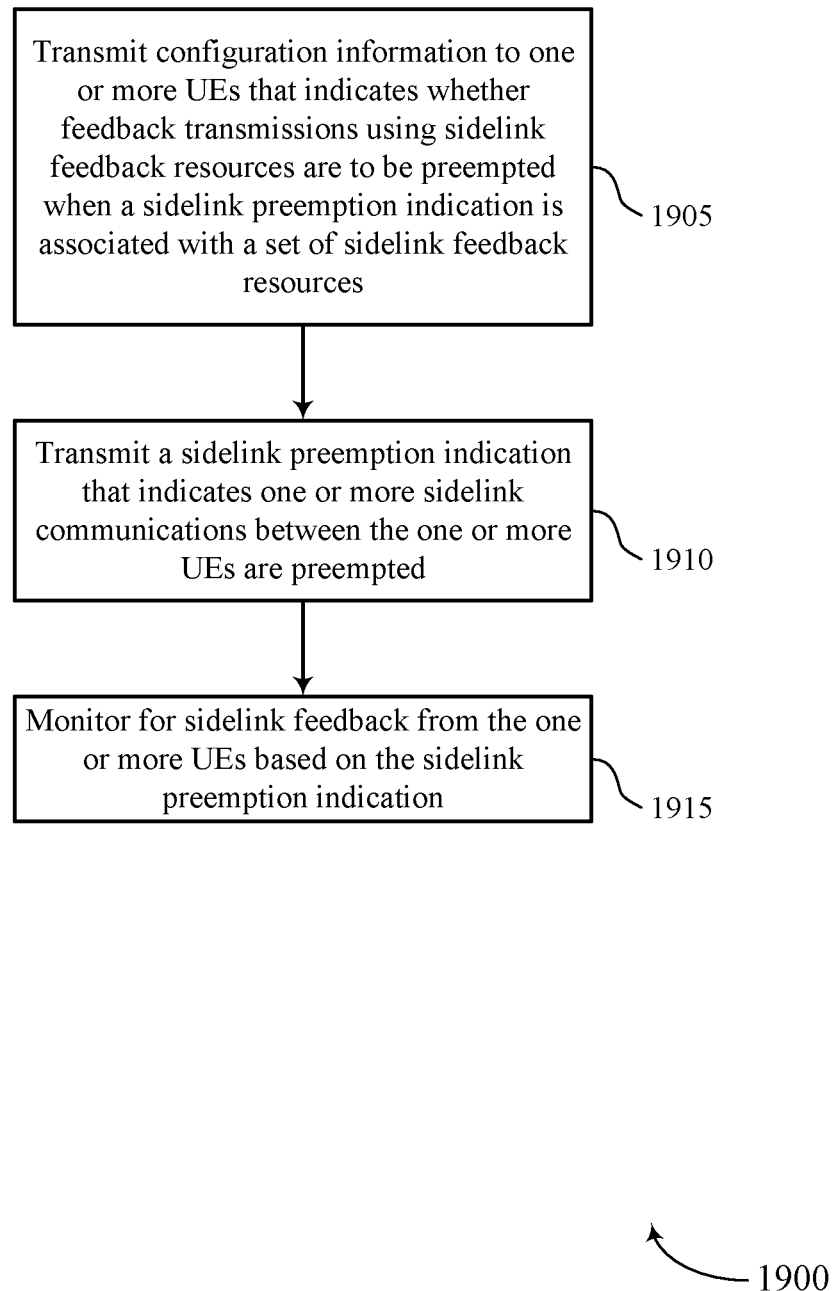

FIG. 19 shows a flowchart illustrating a method 1900 that supports sidelink feedback preemption and uplink multiplexing in wireless communications in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit configuration information to one or more UEs that indicates whether feedback transmissions using sidelink feedback resources are to be preempted when a SPI is associated with a set of sidelink feedback resources. The operations of 1905 may be performed according to the methods described herein. In some examples, aspects of the operations of 1905 may be performed by a configuration manager as described with reference to FIGS. 9 through 12.

At 1910, the base station may transmit a SPI that indicates one or more sidelink communications between the one or more UEs are preempted. The operations of 1910 may be performed according to the methods described herein. In some examples, aspects of the operations of 1910 may be performed by a sidelink preemption manager as described with reference to FIGS. 9 through 12.

At 1915, the base station may monitor for sidelink feedback from the one or more UEs based on the SPI. The operations of 1915 may be performed according to the methods described herein. In some examples, aspects of the operations of 1915 may be performed by a sidelink feedback manager as described with reference to FIGS. 9 through 12.

The following provides an overview of aspects of the present disclosure:

Aspect 1: A method for wireless communication at a first UE, comprising: receiving a sidelink communication from a second UE via a sidelink channel between the first UE and the second UE; identifying a set of sidelink feedback resources for a feedback transmission to the second UE, the feedback transmission providing feedback associated with the sidelink communication from the second UE; receiving a sidelink preemption indication that indicates one or more sidelink communications between the first UE and the second UE are preempted; and determining whether to transmit the feedback transmission to the second UE via the set of sidelink feedback resources based at least in part on the sidelink preemption indication.

Aspect 2: The method of aspect 1, wherein the determining comprises: determining that the feedback transmission is to be transmitted when the sidelink preemption indication is associated with the set of sidelink feedback resources; and transmitting the feedback transmission via the set of sidelink feedback resources.

Aspect 3: The method of aspect 1, further comprising: determining that the feedback transmission is to be preempted when the sidelink preemption indication is associated with the set of sidelink feedback resources; and preempting the feedback transmission via the set of sidelink feedback resources.

Aspect 4: The method of any of aspects 1 through 3, further comprising: receiving configuration information that indicates whether feedback transmissions using sidelink feedback resources are to be preempted when the sidelink preemption indication is associated with the set of sidelink feedback resources; and transmitting or preempting the feedback transmission based at least in part on the configuration information.

Aspect 5: The method of aspect 4, wherein the configuration information is associated with the first UE, is associated with a resource pool of a plurality of resource pools, is associated with a carrier of a plurality of carriers, or any combinations thereof.

Aspect 6: The method of any of aspects 4 through 5, wherein the configuration information is received with a sidelink configuration for the sidelink communications, is received in radio resource control signaling from a serving base station, or any combinations thereof.

Aspect 7: The method of any of aspects 1 through 6, wherein the determining is based at least in part on one or more parameters associated with the sidelink communication and one or more corresponding parameters associated with the sidelink preemption indication.

Aspect 8: The method of aspect 7, wherein the one or more parameters include a priority of the sidelink communication, a priority indicated by the sidelink preemption indication, a unicast or multicast transmission type associated with the sidelink communication, a reference signal received power (RSRP) measurement, a zone identification indicated by the sidelink preemption indication, a resource pool identification provided by the sidelink preemption indication, or any combinations thereof.

Aspect 9: The method of aspect 8, wherein the RSRP measurement is associated with a reference signal from a serving base station, and the sidelink feedback transmission is transmitted based at least in part on the RSRP measurement being at or below a received power threshold provided with the one or more parameters.

Aspect 10: The method of aspect 9, wherein two or more separate RSRP threshold values are provided for two or more priorities of the sidelink preemption indication, for two or more priorities of the sidelink communication, or any combinations thereof.

Aspect 11: The method of any of aspects 1 through 10, wherein the sidelink preemption indication provides one or more of a time/frequency indication of sidelink resources that are to be preempted, a priority associated with the sidelink preemption indication, a zone identification, one or more reference signal received power thresholds for preemption determination, a periodicity of preempted resources, a sidelink resource pool identification, or any combinations thereof.

Aspect 12: A method for wireless communication at a first UE, comprising: transmitting a sidelink communication to a second UE via a sidelink channel between the first UE and the second UE; identifying a set of sidelink feedback resources for sidelink feedback from the second UE associated with reception of the sidelink communication at the second UE; receiving a sidelink preemption indication that indicates one or more sidelink communications between the first UE and the second UE are preempted; and determining whether to transmit the sidelink feedback from the second UE to a serving base station based at least in part on the sidelink preemption indication.

Aspect 13: The method of aspect 12, wherein the determining comprises: determining to preempt transmission of the sidelink feedback to the serving base station based on the sidelink preemption indication indicating preemption of sidelink resources associated with the sidelink communication or the set of sidelink feedback resources.

Aspect 14: The method of aspect 12, further comprising: setting the sidelink feedback from the second UE to indicate a negative acknowledgment based at least in part on the sidelink preemption indication indicating preemption of the sidelink resources associated with the sidelink communication; and transmitting the sidelink feedback to the serving base station.

Aspect 15: The method of aspect 14, further comprising: setting the sidelink feedback from the second UE to indicate the negative acknowledgment based at least in part on the sidelink preemption indication indicating preemption of the set of sidelink feedback resources or based on an absence of sidelink feedback in the set of sidelink feedback resources.

Aspect 16: The method of aspect 15, wherein the negative acknowledgment indication of the sidelink feedback provides a uniform payload size for an uplink control information transmission to the serving base station that includes the sidelink feedback.

Aspect 17: The method of any of aspects 12 through 16, wherein the sidelink preemption indication provides one or more of a time/frequency indication of sidelink resources that are to be preempted, a priority associated with the sidelink preemption indication, a zone identification, one or more reference signal received power thresholds for preemption determination, a periodicity of preempted resources, a sidelink resource pool identification, or any combinations thereof.

Aspect 18: An apparatus for wireless communication at a first UE, comprising a processor; memory coupled with the processor; and instructions stored in the memory and executable by the processor to cause the apparatus to perform a method of any of aspects 1 through 11.

Aspect 19: An apparatus for wireless communication at a first UE, comprising at least one means for performing a method of any of aspects 1 through 11.

Aspect 20: A non-transitory computer-readable medium storing code for wireless communication at a first UE, the code comprising instructions executable by a processor to perform a method of any of aspects 1 through 11.

Aspect 21: An apparatus for wireless communication at a first UE, comprising a processor; memory coupled with the processor; and instructions stored in the memory and executable by the processor to cause the apparatus to perform a method of any of aspects 12 through 17.

Aspect 22: An apparatus for wireless communication at a first UE, comprising at least one means for performing a method of any of aspects 12 through 17.

Aspect 23: A non-transitory computer-readable medium storing code for wireless communication at a first UE, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving a sidelink communication from a second UE via a sidelink channel between the first UE and the second UE;
   identifying a set of sidelink feedback resources for a feedback transmission to the second UE, the feedback transmission providing feedback associated with the sidelink communication from the second UE;
   receiving, from a network entity, a sidelink preemption indication that indicates that one or more physical sidelink shared channels for one or more sidelink communications between the first UE and the second UE are preempted; and
   determining whether to transmit the feedback transmission to the second UE via the set of sidelink feedback resources based at least in part on a first priority associated with the sidelink preemption indication and a second priority associated with the sidelink communication, wherein determining whether to transmit the feedback transmission comprises determining whether the sidelink preemption indication indicates that the set of sidelink feedback resources are preempted in addition to the one or more physical sidelink shared channels.

2. The method of claim 1, further comprising:
   determining that the feedback transmission is to be preempted when the sidelink preemption indication indicates the set of sidelink feedback resources; and
   preempting the feedback transmission via the set of sidelink feedback resources.

3. The method of claim 1, further comprising:
   receiving configuration information that indicates that feedback transmissions using sidelink feedback resources are to be preempted when the sidelink preemption indication indicates the set of sidelink feedback resources; and
   preempting the feedback transmission based at least in part on the configuration information.

4. The method of claim 3, wherein the configuration information is associated with the first UE, is associated with a resource pool of a plurality of resource pools, is associated with a carrier of a plurality of carriers, or any combinations thereof.

5. The method of claim 3, wherein the configuration information is received with a sidelink configuration for the sidelink communication, is received in radio resource control signaling from a serving network device, or any combinations thereof.

6. The method of claim 1, wherein the determining is based at least in part on one or more parameters associated with the sidelink communication and one or more corresponding parameters associated with the sidelink preemption indication.

7. The method of claim 6, wherein the one or more parameters include the second priority of the sidelink communication, the first priority associated with the sidelink preemption indication, a unicast or multicast transmission type associated with the sidelink communication, a reference signal received power (RSRP) measurement, a zone identification indicated by the sidelink preemption indication, a resource pool identification provided by the sidelink preemption indication, or any combinations thereof.

8. The method of claim 7, wherein the RSRP measurement is associated with a reference signal from a serving network device, and wherein the feedback transmission is transmitted based at least in part on the RSRP measurement being at or below a received power threshold provided with the one or more parameters.

9. The method of claim 8, wherein:
   two or more separate RSRP threshold values are provided for two or more priorities of the sidelink preemption indication, for two or more priorities of the sidelink communication, or any combinations thereof.

10. The method of claim 1, wherein the sidelink preemption indication provides one or more of a time/frequency indication of sidelink resources that are to be preempted, the first priority associated with the sidelink preemption indication, a zone identification, one or more reference signal received power thresholds for preemption determination, a periodicity of preempted resources, a sidelink resource pool identification, or any combinations thereof.

11. An apparatus for wireless communication at a first user equipment (UE), comprising:
   a processor,
   memory coupled with the processor; and
   instructions stored in the memory and executable by the processor to cause the apparatus to:

receive a sidelink communication from a second UE via a sidelink channel between the first UE and the second UE;

identify a set of sidelink feedback resources for a feedback transmission to the second UE, the feedback transmission providing feedback associated with the sidelink communication from the second UE;

receive, from a network entity, a sidelink preemption indication that indicates that one or more physical sidelink shared channels for one or more sidelink communications between the first UE and the second UE are preempted; and determine whether to transmit the feedback transmission to the second UE via the set of sidelink feedback resources based at least in part on a first priority associated with the sidelink preemption indication and a second priority associated with the sidelink communication, wherein determining whether to transmit the feedback transmission comprises determining whether the sidelink preemption indication indicates that the set of sidelink feedback resources are preempted in addition to the one or more physical sidelink shared channels.

12. The apparatus of claim 11, wherein the instructions are further executable by the processor to cause the apparatus to:
determine that the feedback transmission is to be preempted when the sidelink preemption indication indicates the set of sidelink feedback resources; and
preempt the feedback transmission via the set of sidelink feedback resources.

13. The apparatus of claim 11, wherein the instructions are further executable by the processor to cause the apparatus to:
receive configuration information that indicates that feedback transmissions using sidelink feedback resources are to be preempted when the sidelink preemption indication indicates the set of sidelink feedback resources; and
preempt the feedback transmission based at least in part on the configuration information.

14. The apparatus of claim 11, wherein the determination to preempt the feedback transmission is based at least in part on one or more parameters associated with the sidelink communication and one or more corresponding parameters associated with the sidelink preemption indication.

15. The apparatus of claim 14, wherein the one or more parameters include the second priority of the sidelink communication, the first priority associated with the sidelink preemption indication, a unicast or multicast transmission type associated with the sidelink communication, a reference signal received power (RSRP) measurement, a zone identification indicated by the sidelink preemption indication, a resource pool identification provided by the sidelink preemption indication, or any combinations thereof.

16. The apparatus of claim 11, wherein the sidelink preemption indication provides one or more of a time/frequency indication of sidelink resources that are to be preempted, the first priority associated with the sidelink preemption indication, a zone identification, one or more reference signal received power thresholds for preemption determination, a periodicity of preempted resources, a sidelink resource pool identification, or any combinations thereof.

17. The apparatus of claim 13, wherein the configuration information is associated with the first UE, is associated with a resource pool of a plurality of resource pools, is associated with a carrier of a plurality of carriers, or any combinations thereof.

18. The apparatus of claim 13, wherein the configuration information is received with a sidelink configuration for the sidelink communication, is received in radio resource control signaling from a serving network device, or any combinations thereof.

19. The apparatus of claim 15, wherein the RSRP measurement is associated with a reference signal from a serving network device, and wherein the feedback transmission is transmitted based at least in part on the RSRP measurement being at or below a received power threshold provided with the one or more parameters.

20. The apparatus of claim 19, wherein two or more separate RSRP threshold values are provided for two or more priorities of the sidelink preemption indication, for two or more priorities of the sidelink communication, or any combinations thereof.

* * * * *